US010672070B2

(12) United States Patent
Feilbogen et al.

(10) Patent No.: US 10,672,070 B2
(45) Date of Patent: **\*Jun. 2, 2020**

(54) METHOD AND SYSTEM FOR INITIATING AND CLEARING TRADES

(71) Applicant: American International Group, Inc., New York, NY (US)

(72) Inventors: Robert J. Feilbogen, Chappaqua, NY (US); Paul Varnish, London (GB)

(73) Assignee: American International Group, Inc., New York, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 14/224,591

(22) Filed: Mar. 25, 2014

(65) Prior Publication Data

US 2014/0236798 A1 Aug. 21, 2014
US 2016/0155197 A9 Jun. 2, 2016

Related U.S. Application Data

(60) Continuation of application No. 12/054,026, filed on Mar. 24, 2008, now Pat. No. 8,682,776, which is a
(Continued)

(51) Int. Cl.
*G06Q 40/02* (2012.01)
*G06Q 40/04* (2012.01)
(Continued)

(52) U.S. Cl.
CPC ............. *G06Q 40/04* (2013.01); *G06Q 40/00* (2013.01); *G06Q 40/02* (2013.01); *G06Q 40/06* (2013.01)

(58) Field of Classification Search
CPC ........ G06Q 10/06; G06Q 40/00; G06Q 30/00; G06Q 4/00; G06Q 40/04; G06Q 20/10; G06Q 40/02; G06Q 40/06
(Continued)

(56) References Cited

U.S. PATENT DOCUMENTS 5,794,206 A * 8/1998 Wilkinson .......... G06F 17/2264
705/1.1
5,794,234 A * 8/1998 Church ............... G06F 17/2264
(Continued)

FOREIGN PATENT DOCUMENTS

WO WO 00/77709 A1 12/2000

OTHER PUBLICATIONS

"The Bank of New York, World's Largest Custodian Bank, Joins FXall™. AVT Technologies, a Key Partner, Will Provide the Core Trade-Routing Mechanism." AVT Technologies press release, Oct. 13, 2000, 3 pages.
(Continued)

*Primary Examiner* — Nga B Nguyen
(74) *Attorney, Agent, or Firm* — Leydig, Voit & Mayer, Ltd.

(57) ABSTRACT

A system and method are provided for facilitating the exchange of data between one or more price providers and customers who communicate with the price providers through various portals, each of which may use it own data format. In transmitting data from customer to price provider, the data output from each portal is normalized to a standardized format and then transmitted to the appropriate price provider(s) where the data exchanged with the various portals can be viewed by a trader at a single display or can be exchanged with an automated pricing engine. The customer may also be provided with a universal Web site at which a customer may access any of the portals' Web sites to simplify access for the customer as well.

8 Claims, 16 Drawing Sheets

Related U.S. Application Data division of application No. 09/848,931, filed on May 4, 2001, now Pat. No. 7,424,452.

(60) Provisional application No. 60/207,570, filed on May 26, 2000, provisional application No. 60/203,324, filed on May 11, 2000, provisional application No. 60/202,381, filed on May 4, 2000.

(51) Int. Cl.
*G06Q 40/06* (2012.01)
*G06Q 10/06* (2012.01)
*G06Q 40/00* (2012.01)

(58) Field of Classification Search
USPC .......................................... 705/37, 36 R, 35
See application file for complete search history.

(56) References Cited

U.S. PATENT DOCUMENTS

| | | | |
|---|---|---|---|
| 5,864,827 A | | 1/1999 | Wilson |
| 5,873,071 A | * | 2/1999 | Ferstenberg ........... G06Q 40/00 705/36 R |
| 5,884,285 A | | 3/1999 | Atkins |
| 5,987,432 A | | 11/1999 | Zusman et al. |
| 6,016,483 A | | 1/2000 | Rickard et al. |
| 6,039,245 A | | 3/2000 | Symonds et al. |
| 6,167,386 A | | 12/2000 | Brown |
| 6,278,982 B1 | | 8/2001 | Korhammer et al. |
| 6,347,307 B1 | | 2/2002 | Sandhu et al. |
| 6,408,282 B1 | * | 6/2002 | Buist ...................... G06Q 40/04 705/36 R |
| 6,519,574 B1 | * | 2/2003 | Wilton ................... G06Q 30/00 705/35 |
| 6,601,044 B1 | * | 7/2003 | Wallman ................ G06Q 40/00 705/35 |
| 6,850,991 B1 | | 2/2005 | Young et al. |
| 7,246,092 B1 | * | 7/2007 | Peterson ................ G06Q 20/10 705/35 |
| 7,308,428 B1 | * | 12/2007 | Federspiel ............. G06Q 40/00 705/35 |
| 7,424,452 B2 | | 9/2008 | Feilbogen et al. |
| 7,451,107 B1 | * | 11/2008 | Chvala ................... G06Q 10/06 705/37 |
| 7,720,742 B1 | * | 5/2010 | Mauro ................... G06Q 40/00 705/37 |
| 2002/0065752 A1 | * | 5/2002 | Lewis ..................... G06Q 30/04 705/35 |

OTHER PUBLICATIONS

"Centradia Name Chosen for First Multi-Bank, Multi-Product On-Line Financial Marketplace." AVT Technologies press release, Jun. 18, 2001, 1 page.

"Currenex Partners With a VT Technologies to Streamline FX Dealing." A VT's Technologies press release, Oct. 26, 2001, 2 pages.

"Atriax and AVT Technologies Have Integrated AVT's EchoFX Trading Engine and the Atriax Dealing System." AVT Technologies press release, Oct. 31, 2001, 1 page.

Informational Materials reA VT Technologies from www.avt.co.uk-17 pages.

Documents from Integral web site including press release entitled "Integral Autodealer Lets Banks Respond Immediately to Quote Request in Online Capital Markets Dealing," Apr. 10, 2001, and description of "Integral Autodealer" and "Integral Connect," from www.integral.com, 10 pages.

"Cognotec and Financial Software Systems Announce Collaboration Agreement for FX Margin Trading," Cognotec press release, Apr. 5, 2001, 2 pages.

"Cognotec set to become 'connectivity enabler of choice' for forex banks with launch of FXall Connect," Cognotec press release, Feb. 16, 2001, 3 pages.

Cognotec announces collaboration agreement with Atriax, Cognotec press release, Mar. 19, 2001, 2 pages.

"EBS Spot Dealing System," from www.ebsp.com 1 page.

"CFOWeb.com," Integral Development Corp., from www.cfoweb.com, 1 page.

"FXall," FX Alliance, LLC, 2001, from www.fxall.com, 1 page.

"Atriax Global Briefings," from www.atriax.com, 1 page.

"Currenex Global Financial Exchange" Currenex, Inc., 2001, from www.currenex.com, 2 pages.

Documents from www.finxml.org, including "FinXMLTM the Digital Language for Capital Markets" press release, Jul. 7, 1999, and "Information," 6 pages.

"FpML™: A Standard for Financial Derivatives Business-to-Business e-Commerce," from www.FpML.org, 2 pages.

"The Financial Information eXchange (FIX) Protocol," from www.fixprotocol.org, 6 pages.

"Financial Information Exchange Protocol (FIX)," Version 4.2, Mar. 1, 2000, pp. i-iv, 1-267 and Release Notes pp. 1-9.

United States Patent and Trademark Office, International Search Report in International Patent Application PCT/US2001/014422 (dated Jul. 16, 2001).

\* cited by examiner

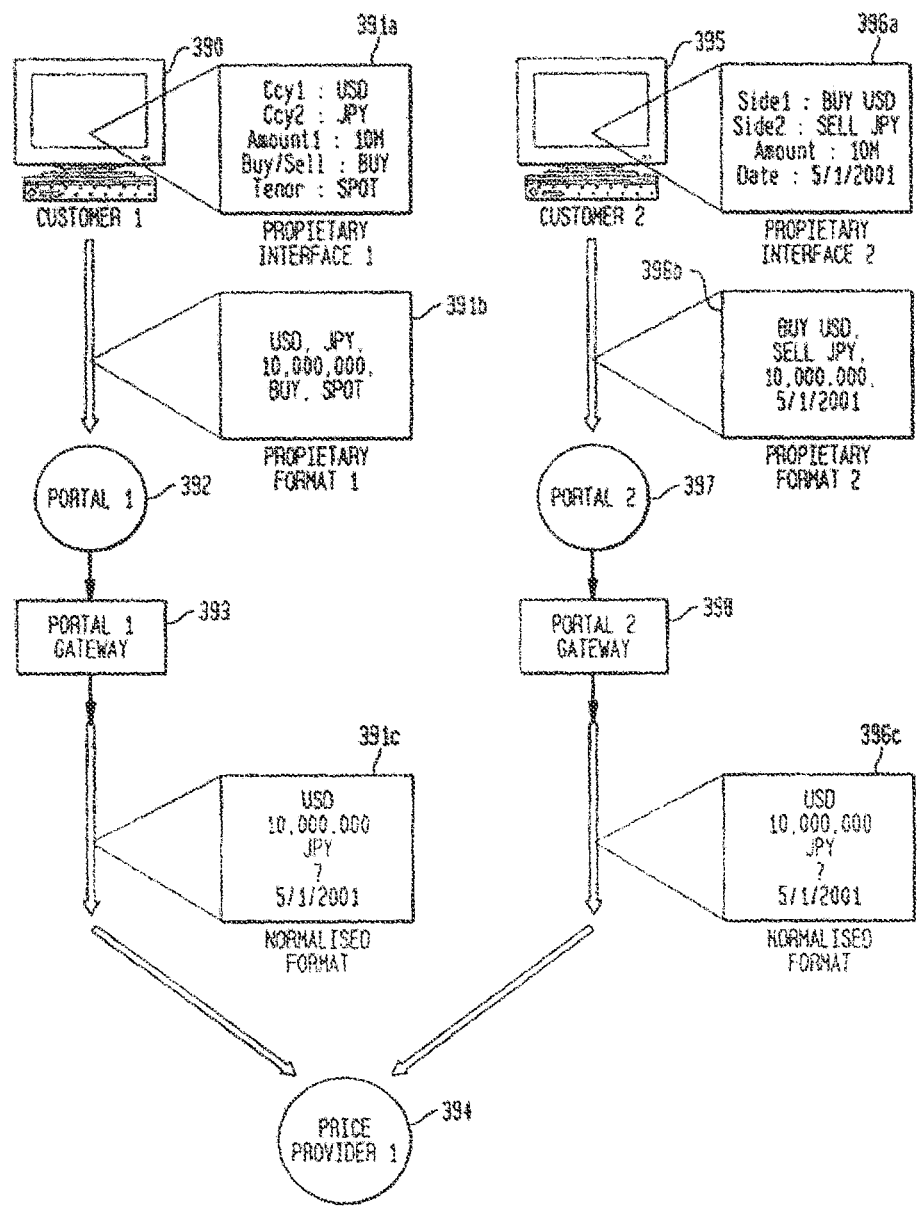

FIG. 11A

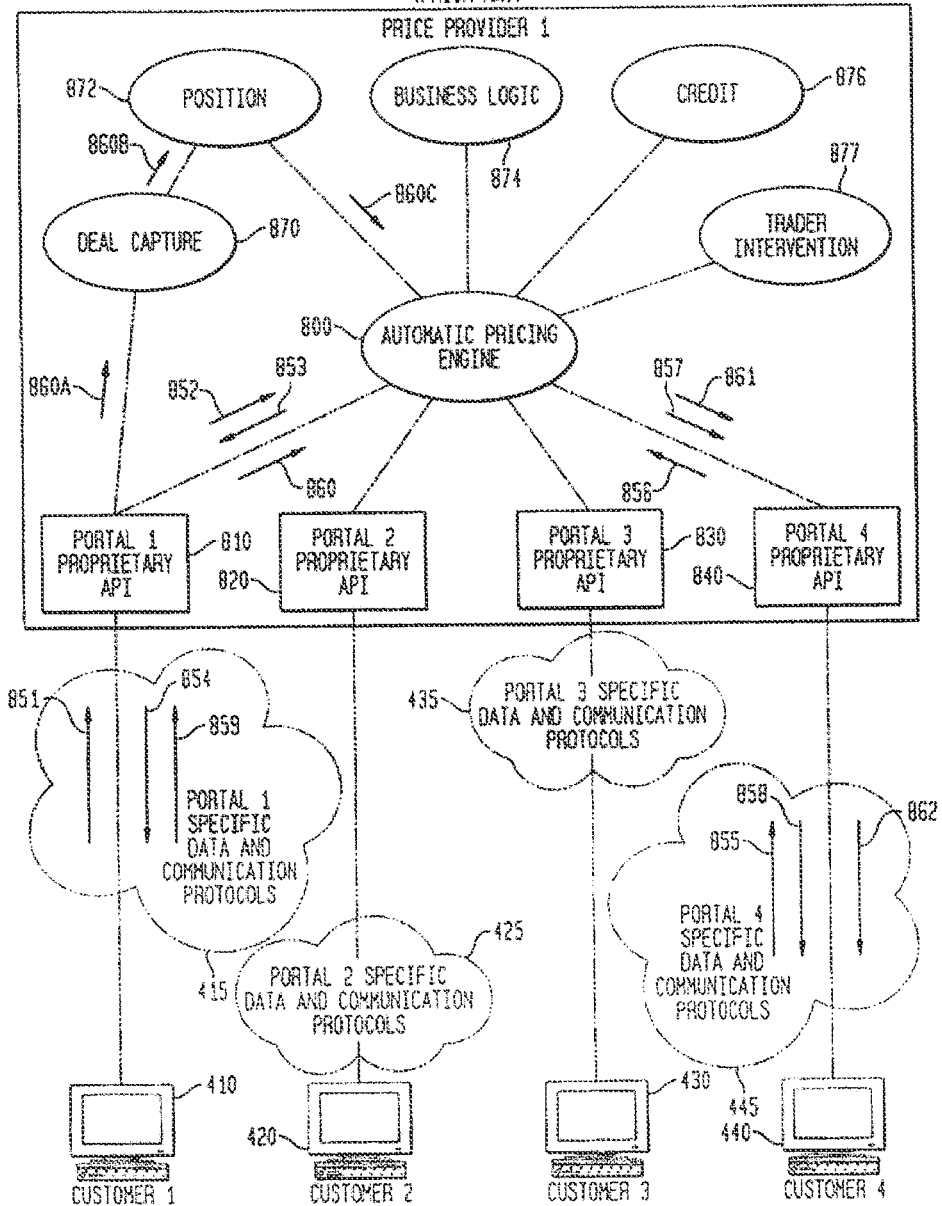

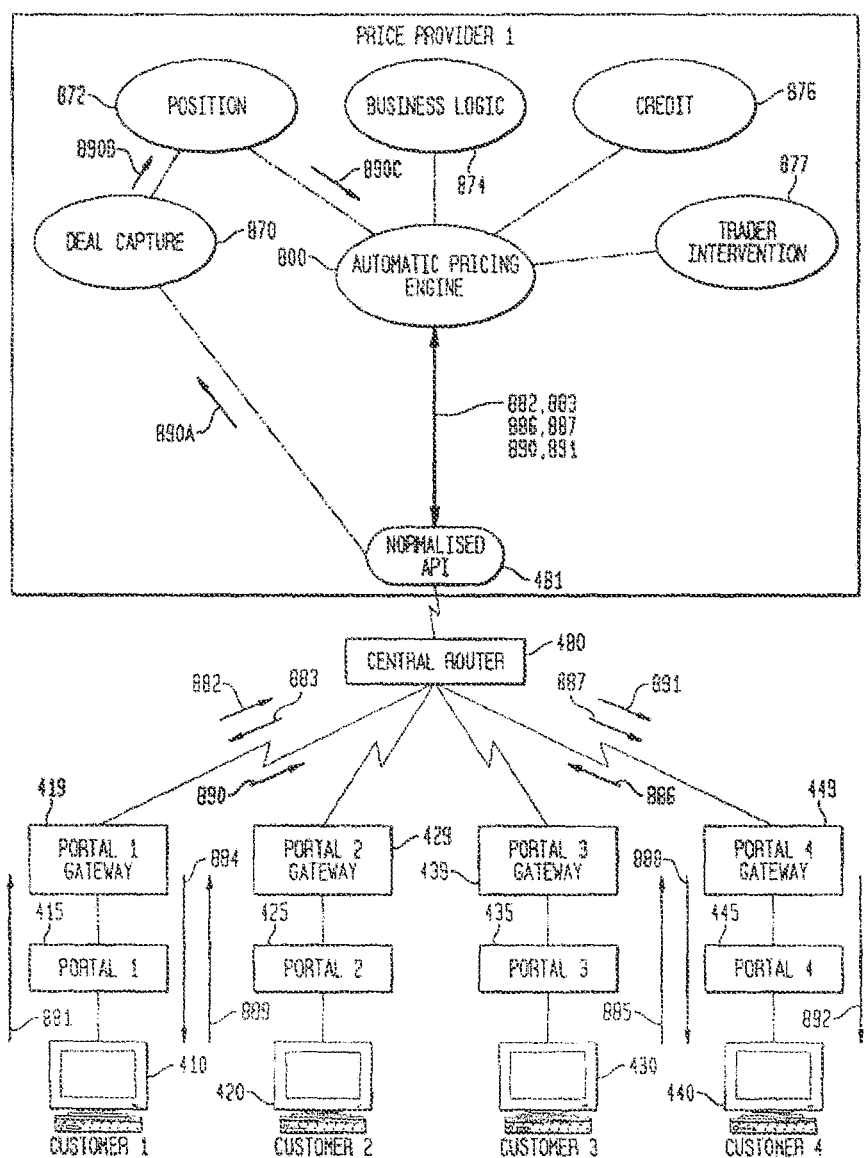

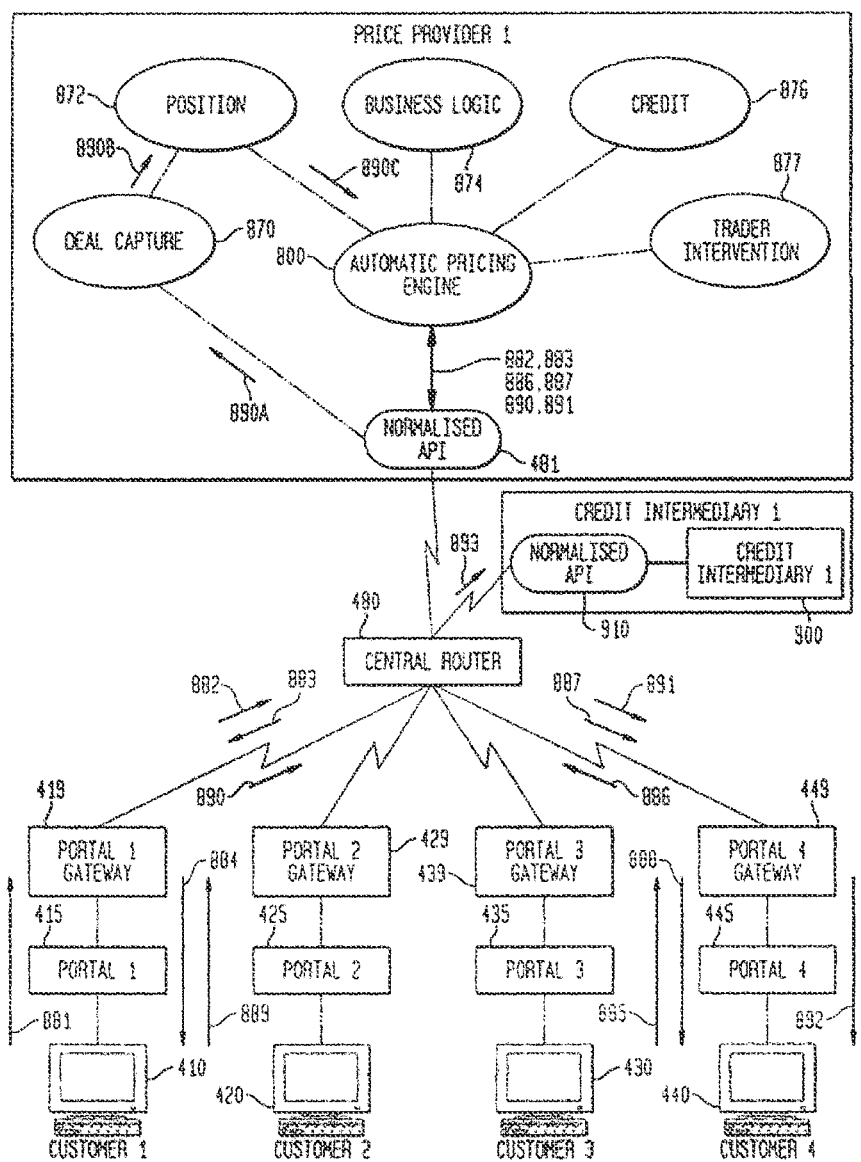

METHOD AND SYSTEM FOR INITIATING AND CLEARING TRADES

CROSS-REFERENCE TO RELATED APPLICATIONS

The present application is a continuation of U.S. patent application Ser. No. 12/054,026, filed Mar. 24, 2008, which is a divisional of U.S. patent application Ser. No. 09/848,931, filed May 4, 2001, which is related to and claims the benefit of U.S. provisional patent application Ser. No. 60/202,381, filed May 4, 2000, Ser. No. 60/203,324, filed May 11, 2000, and Ser. No. 60/207,570, filed May 26, 2000, all of the foregoing being entitled "Method And System For Initiating And Clearing Trades." The content of these applications is incorporated herein by reference.

FIELD OF THE INVENTION

The present invention is directed to the field of financial instrument and commodities trading and, in particular, to a method and system for initiating, negotiating, completing, and settling such trades, while minimizing risks and cost. Any type of item may be traded with this invention. Hence, the term "financial instrument" is used herein to refer to any type of tradable item.

BACKGROUND OF THE INVENTION

The financial instruments and commodities trading industry is at the core of many industries, including agriculture, base metals, energy, foreign exchange and others. Generally speaking, trades are effectuated between two separate entities or parties (each commonly referred to as a "counterpart"). The counterparts routinely engage in financial transactions, such as foreign exchange transactions and interest rate transactions, the buying and selling of financial instruments, and commodities. The particular types of financial instruments and commodities that are traded between counterparts are too numerous to name. Common concerns, however, with respect to risk exposure exist among the many parties engaging in the trading business and across each of the different financial instruments and commodities.

A counterpart to a financial transaction who has the capacity to provide and negotiate a price for the transaction is commonly referred to and is referred to herein as the "price provider" (also commonly referred to as a "market maker" or as an "fx liquidity provider"). A price provider is generally a financial institution, like a commercial bank, a trading company, or an exchange. A counterpart who engages in price negotiations with a price provider for a trade may be referred to as a "customer". Customers can be any entity such as a financial institution, a corporation, a hedge fund, a pension fund, an institutional investor, a commercial producer or user, a sovereign entity, and the like but may also refer to any entity or individual who engages in or wishes to engage in a trade with a price provider. It should be emphasized though that an entity that is considered a price provider for one transaction may fill the role of the "customer" for another transaction.

Counterparts presently conduct trades in many ways, several of which are shown in FIG. 1. Counterparts may deal with one another by telephones 10, 12 connected through a telephone network 14. The details of the trade are discussed among representatives of the two counterparts and manually written onto trade tickets to formalize and memorialize the trade. The telephone conversation may be tape-recorded to insure the integrity of the trade. Much of the trading between counterparts has been traditionally conducted in this manner and still is conducted this way.

A second method of conducting transactions and negotiations for transactions between counterparts emerged with the advent of computer systems and the ability to communicate data electronically via telephone lines. In this method, computerized systems such as Reuters, Bloomberg, and EBS (Electronic Broking Service used primarily for interbank data exchange) 20 serve as electronic portals ("portal networks" or "trading interfaces") for conducting trading electronically between counterparts, among other things. In such systems, each counterpart has a computer terminal 22, 24 with a keyboard or other user interface device (not shown) and an associated display. Multiple counterparts are generally connected to the portal on either side of the portal.

A counterpart who wishes to conduct business over a particular portal is only able to conduct business with other subscribers to that specific portal or with counterparts connected to that specific portal. To conduct business with counterparts who only subscribe to a different portal, a separate subscription to the second portal is required. For any portal that can be accessed only through a dedicated terminal or whose full portal functionality can also be accessed in this manner, each price provider must maintain multiple terminals in order to achieve the maximum advantages of conducting business with many customers.

Each portal may utilize secure, dedicated lines to transmit the data from counterpart to counterpart. In this way, such systems provide security from third party interruption or interception. In operation, the initiating customer contacts the price provider with a request for a price quote (a "price") using the portal for a particular financial instrument or commodity through a terminal for that portal. The customer price quote request will comprise various types of information about the customer such as the customer name and other necessary identification information, the type of transaction that the customer wishes to conduct (e.g. the financial instrument to be traded, the foreign currency to be exchanged such as yen/$ or $/yen), and the name(s) of the price provider or providers to whom the request should be sent. The portal takes the request and routes it to the price provider via the portal's data center. The parties may engage in an exchange of trade information for negotiating and finalizing the particular details of the trade using a portal-specific defined set of data formats. However, on certain portals such as Reuters, the customers may optionally engage in negotiations using a free-format text-based conversation which the portal can parse to determine the trade information that the customer and price provider wish to exchange. In other instances, rather than negotiate prices, the price provider may publish a price (or "make a market") for the particular financial instrument or commodity that is the subject of the trade. Once the transaction is completed and accepted by both counterparts, the system generates an electronic ticket containing the trade details. For example, the Reuters Direct Dealer system produces a trade ticket using a proprietary ticket output feed (TOF) format. Bloomberg uses a FIX (financial information exchange protocol) format. Other portals use other formats.

Notably, not every system generates an electronic ticket. Moreover, merely having the capability of creating an electronic ticket does not ensure the ability to efficiently use it. The price providers are generally not equipped to electronically interface every portal's proprietary data format to their internal systems, including trading and back office platforms. Thus, automated interaction between systems is not efficient at this time.

More recently, Web-based systems 30 utilizing graphical user interfaces (GUIs) and internet protocol (IP) data transmissions, such as TCP/IP, have been developed for the purpose of initiating and completing financial instrument and commodities trades between counterparts 32, 34. These Web-based systems have become a significant third method of conducting transactions and negotiations related to the proposed transactions among counterparts. Web-based systems operate in substantially the same manner to effectuate trades as the Reuters-type systems, except that the network can be accessed from anywhere using a terminal with Internet access.

Each of the above-discussed trading systems have shortcomings which are common among them. To satisfy the many needs and preferences of its customers, a price provider must offer its customers the ability to deal through any one of the types of systems currently known. This flexibility, however, currently requires the price provider to purchase and install separate hardware and software systems unique to each particular trading system, thereby increasing the cost and inefficiencies of the trading business. The hardware required at each price provider for systems like Reuters and Bloomberg includes hardware to connect to each of the portals and can include specialized monitors and keyboards. The specialized software at each price provider can include separate application program interfaces (APIs) for each portal, which translate the data from the portal-specific format to an appropriate format for use by the price provider's internal systems. The APIs are required for the price provider to achieve "straight through processing" between the portals and the price provider's internal systems.

Because the software for the known trading systems are not compatible with one another, there is no unified system for capturing the trade details for the trades made through the many systems or for automatically importing the trade details into a back-office settlement system. To capture and import the trade details, the price provider must design and install separate middleware for each portal. As described above, it is inefficient and costly to settle trades completed on such systems and may expose the price provider to operational risk due to human error in manually capturing the trade details and inputting them into the back-office settlement system. Capture of trade data in a uniform format would be beneficial because it eliminates the potential for human error in manually inputting trade details into a back-office settlement system. Furthermore, trades could be instantly recognized by the back-office settlement system and used to manage the various credit concerns associated with dealing with particular entities or individuals.

Moreover, each system utilizes different interfaces, including different screen layouts and different mappings of system commands to keys. The personnel must be trained in the particular conventions used by each separate system if personnel are to be able to operate the systems interchangeably. Of greater concern though is that an employee will press an incorrect key or otherwise enter an incorrect command at a terminal for a first portal because that employee is used to operating a terminal for a second different portal. For example, pressing an "F8" key at an interface to a first portal may cause the trade to be completed, whereas pressing the "F8" key at an interface to a second portal may cause the trade to be cancelled. This is inefficient and the overwhelming number of terminals exposes the price provider to both operational and market risks.

Another shortcoming of the prior art systems is that the products to be traded are packaged by portal rather than by type of product, with each portal covering a different range of products to be traded. This means that, for example, a first portal makes available a first group of products, such as precious metals and base metals, and a second portal makes available a second group of products such as foreign exchange and base metals. A trader must review multiple screens on multiple portals to be able to comprehensively review information available through the various portals in order to make decisions such as pricing for a specific type of product, such as base metals in this example, whether to make a price quote to a customer, and whether to withdraw a price quote. This packaging of information is inefficient and does not fit the typical organization of trader expertise and skills at a price provider where each trader is typically an expert in pricing of only one or a few types of financial instruments or commodities. It would be preferable to be able to package pricing information for a single type of product, such as base metals, to aggregate all pricing information for that product on all portals on a single screen. Comprehensive information from multiple portals for a particular product can then be delivered to a trader who is an expert in that product.

These problems are illustrated in FIG. 2 which depicts an example of one possible transaction system in which there is a relationship between three customers and two price providers under the current prior art regime. In this example, the portals are arranged to connect a certain set of price providers and subscribing customers. Customer.sub.1 31 50 is a first customer who has access to Price Provider 1 40 and Price Provider 2 46 using the Atriax Web portal 52. Atriax 52 connects the customer through the Internet 100 and Atriax's data center 53 to Price Providers 1 and 2 where Price Providers 1 and 2 monitor an Atriax Web browser 102 (or a separate Web page accessed using a conventional browser). Customer.sub.1 32 60 is a second customer who has access to Price Providers 1 and 2 through a Bloomberg terminal 62 or may access Price Provider 2 through a Price Provider 2 Web site 64. The Bloomberg terminal 62 connects to the Bloomberg network 90 and Bloomberg's data center 91 which in turn is connected to a separate Bloomberg terminal 92 for monitoring at each of Price Providers 1 and 2. The Price Provider 2 Web site 64 connects through the Internet 100 to a Price Provider 2 data center 65 which Price Provider 2 accesses for monitoring via a Price Provider 2 browser 108. Each of the Web browsers may be displayed on the same monitor in different windows or on separate monitors. As illustrated, the Price Provider 1 does not have access to the Price Provider 2 Web site 64. Customer.sub.1 33 70 has access to Price Providers 1 and 2 through a Reuters terminal 72, the "Currenex" Web site 74 (via Internet 100 and Currenex data center 75), and the Treasury Connect Web site 76 (via Internet 100 and Treasury Connect data center 77).

For efficient processing, trade information for trades made at Price Provider 1 40 can be passed to Price Provider 1's internal computer systems 44. However, this requires Price Provider 1 to integrate hardware and middleware associated with each terminal, and build a separate API for each portal to interface with the price provider's internal systems 44, 49. There is a large variation of formats in which the portals provide trade confirmations, at least most, if not all, of the formats being incompatible. For example, Reuters 72 uses its proprietary TOF format 92. Bloomberg 60 uses the FIX format 94, Atriax 52 might use an XML-based data format XML1 110, like FinXML (financial extensible markup language) or FPML (financial products markup language) formats, Treasury Connect 76 may use a second XML-based format XML2 112, Currenex may use a third XML format XML3 114, and Price Provider 2's Web site 64 may use yet another XML-based format (XML4) 116. Price Provider 2 faces similar challenges in interfacing these varying formats with its internal systems 49.

Another item of particular concern to price providers is commonly referred to as "price aging". A price provider may have provided a particular price or a series of prices for trading a particular financial instrument or commodity. As the market moves in a particular direction, it may be desirable for the price provider to retract (withdraw) a price from one or all of the systems. There is currently no way to automatically retract the prices simultaneously from each portal's system. Besides the inefficiency of retracting prices separately from each portal, the time lost in manually retracting prices from each system may cause a stale or undesirable price to be hit or accepted by a counterpart, thereby exposing the price provider to market risk.

At times, a customer may have insufficient credit or may wish to obtain a credit line from a third party for some other reason. In this case, before arranging a trade, the customer must first obtain a credit line from a third party (a "credit intermediary") who provides credit intermediation between the customer and the price provider. Where there is a credit intermediary involved, yet another shortcoming of the presently known systems is that the various portal systems do not enable credit intermediaries to adequately manage the credit exposure with their customers. The ability to manage such risk is particularly important when a creditworthy financial institution acts as a credit intermediary for a customer who otherwise might not be able to trade due to a lack of credit. This is because the credit intermediary also assumes the role of a principal on behalf of all transactions entered into by the customer and, as principal, is liable to the price providers with whom the customer is trading in the name of the principal.

Currently, there is no efficient way of managing such credit risk in a live trading environment. While the customer can deal through any of the known trading systems and portals, there is no centralized mechanism for gathering trade details across these portals and hence no efficient way of determining risk exposure in real-time. In addition, there is no uniform system for controlling the customer's access to price providers which the credit intermediary has authorized. Consequently, the price providers are also exposed to a degree of risk, because they may be subject to limits in the size of the transactions which the customer may initiate where the credit intermediary is a principal and will have difficulty monitoring such limits with the current types of trading systems.

Therefore, there is a need and desire to provide a method and system that seamlessly integrates the features of the many different proprietary electronic trading systems/portals (of course, other than the telephone trading) to enable price providers to centrally interact with the portals in a way that reduces the described risks and costs. This includes the ability to monitor trading risk across multiple portals and efficiently manage trading work flow. Furthermore, there is a need to provide a system which utilizes a standard data transmission format to permit automated pricing engines to service many portals and to permit the automated capture of trade details. Yet another need exists for a system that enables credit intermediaries to efficiently monitor and manage risk exposure created by its customers and to selectively limit the price providers with which customers may trade and the size of such transactions. The present inventive concepts, which are described in connection with the following embodiments, satisfy these and other needs.

SUMMARY OF THE INVENTION

It is therefore an object of the present invention to provide a method of doing business in which the risks and costs associated with a price provider's interaction with multiple portals are reduced.

It is a further object of the invention to enable this method of doing business by providing a method and system for normalizing data from the multiple portals before the data is received by the price providers.

It is a further object of the invention to provide a method and system to enable a price provider to monitor data from multiple financial-related portals and to interact with customers who access the price provider through the multiple portals with a substantially uniform interface.

It is a further object of the invention to provide a method and system to enable a price provider to interact with customers who access the price provider through multiple portals using an automated pricing engine.

These objectives are achieved in accordance with the present invention by a method and system in which data relating to trading of financial instruments can be exchanged between customers and price providers through multiple portals which utilize different data formats and protocols.

The method comprises normalizing data from multiple portals by translating the data from a portal-specific data format to a standardized data format, if a portal-specific format for a particular portal is not the same as the standardized format. The normalization may further comprise the translation of communication protocols as well. The data can then be aggregated into a combined data stream from the multiple portals and used in various ways at the price provider. Data being transmitted from the price providers to the customers of multiple portals must be "de-normalized", i.e. translated from the standardized format to the portal-specific format.

By normalizing the data, the data exchanged with the multiple portals may be displayed on a single monitor to a trader at a price provider. The trader can either respond manually to a price request or allow normalized data to be fed to an automated pricing engine at the price provider, which can be used to provide prices and negotiate trades. The data normalization also enables straight through processing of a trade by transmitting normalized trade detail data to the price provider's internal systems, and the transmission of trade detail data to a customer intermediary, if any, which can more quickly monitor its risk exposure across multiple portals. More generally, normalizing data into a standardized format enables the integration of the incoming/outgoing data from multiple portals with the price provider's internal computer systems.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims.

BRIEF DESCRIPTION OF THE DRAWINGS

In the drawings, wherein like reference numerals denote similar elements through out the several views:

FIG. 9 depicts how two data streams from different portals can be normalized to a standardized format;

FIG. 11A is a sample screen at a price provider according to another embodiment of the invention on which data from multiple portals is displayed in a uniform format;

FIG. 12A depicts another example of a prior art system in which an automated pricing engine monitors and interacts with multiple portals;

FIG. 12B depicts a system analogous to the system of FIG. 12A but where the data from the multiple portals is normalized before it is transmitted to the price providers; and FIG. 12C depicts the system of FIG. 12B but with the addition of a credit intermediary who links to the Central Router.

DETAILED DESCRIPTION OF THE PREFERRED EMBODIMENTS

Some embodiments of the present invention are now described in further detail with reference to FIGS. 3-12C.

Figure 3:
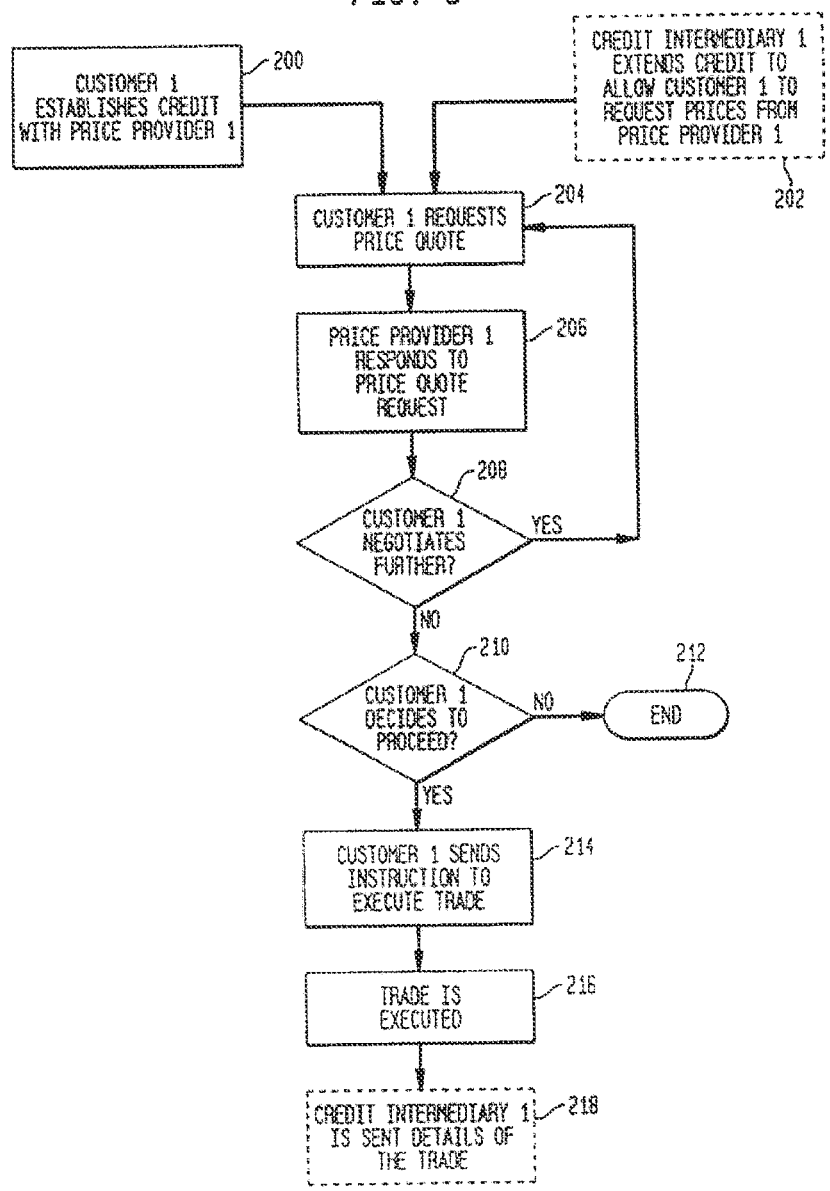
FIG. 3 is a flow chart illustrating the basic steps for initiating and executing trades.

FIG. 3 is a flow chart of the basic steps that occur in each trade. At step 200, a customer, Customer 1, establishes credit with a price provider, Price Provider 1. Alternatively, at step 202, a credit intermediary, Credit Intermediary 1, extends credit to allow Customer 1 to request prices from Price Provider 1. At step 204, Customer 1 requests a price quote for a trade from Price Provider 1 (and possibly other price providers as well). Price Provider 1 may then provide a price quote for that trade at step 206. If the price quoted is not acceptable to the Customer 1, Customer 1 may choose to further negotiate the terms of the proposed trade further by requesting better terms or proposing a counteroffer (step 208) and steps 204-208 are repeated until Customer 1 and Price Provider 1 agree on a price or decide not to negotiate further. If the negotiations are unsuccessful or Customer 1 decides not to proceed with the trade for some other reason (step 210), the discussions end (step 212). If Customer 1 decides to accept the price quote and proceed with the trade, Customer 1 sends an instruction to Price Provider 1 to execute the trade (step 214) and the trade is executed (step 216). Trade details may then be sent from the Price Provider to Customer 1 and to Credit Intermediary 1, if there is one (step 218). Some or all of these steps are automated in straight through processing.

Figure 4:
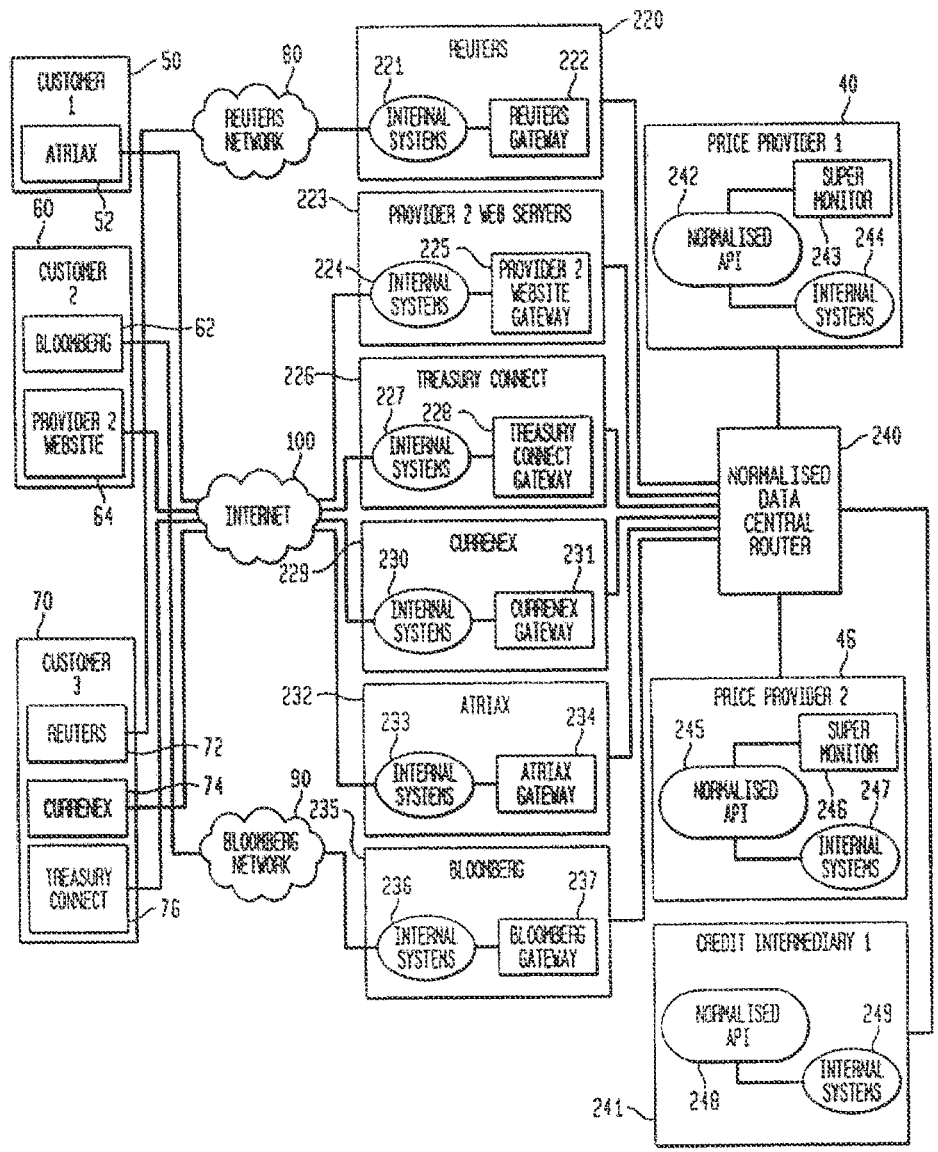
FIG. 4 depicts an example of the streamlined relationships among the customers, portals, and price providers who exchange data relating to the trading of financial instruments in accordance with the present invention.

FIG. 4 is a diagram depicting an example of a set of possible relationships among counterparts and a way in which they can be connected to facilitate the exchange of trade-related data in accordance with an embodiment of the invention. In this figure, as in FIG. 2, Customer.sub.131 50 has arranged for access to Price Providers 1 and 2 40, 46 through the Atriax Web site 52. Web site 52 is routed through the Internet 100 to Atriax's data center 232. Customer.sub.132 60 has arranged for access to Price Providers 1 and 2 40, 46 through a Bloomberg system 62. Communications from the Bloomberg system 62 are routed through the private Bloomberg network 90 to Bloomberg's data center 235. Customer.sub.132 has also arranged for direct access to Price Provider 2 46 through Price Provider 2's Web site 64. Data entered at Web site 64 is routed through the Internet 100 to Price Provider 2's data center 223. Customer.sub.133 70 has arranged for access to Price Providers 1 and 2 40, 46 through Reuters 72 and the private Reuters network 80, which connects to Reuters' data center 220. Customer.sub.133 has also arranged for access to the Currenex Web site 74 and access to the Treasury Connect Web site 76. Both of these Web sites 74, 76 are routed through the Internet 100 to respective data centers 229, 226. Each of the different portals may use different portal-specific formats, such as different codes for the same type of transaction.

Figure 1:
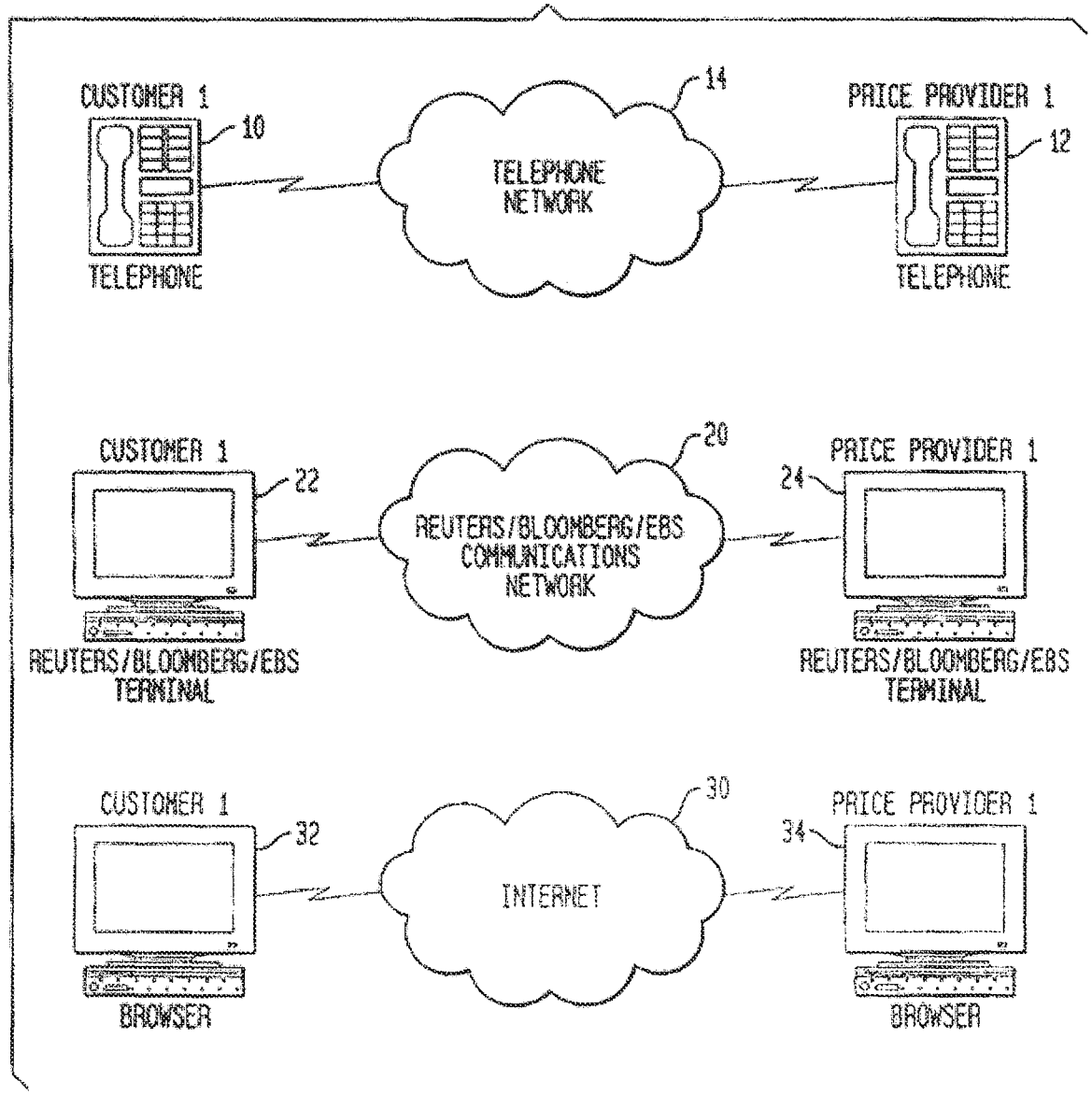
FIG. 1 depicts several prior art systems on which customers can communicate with price providers.
Figure 2:
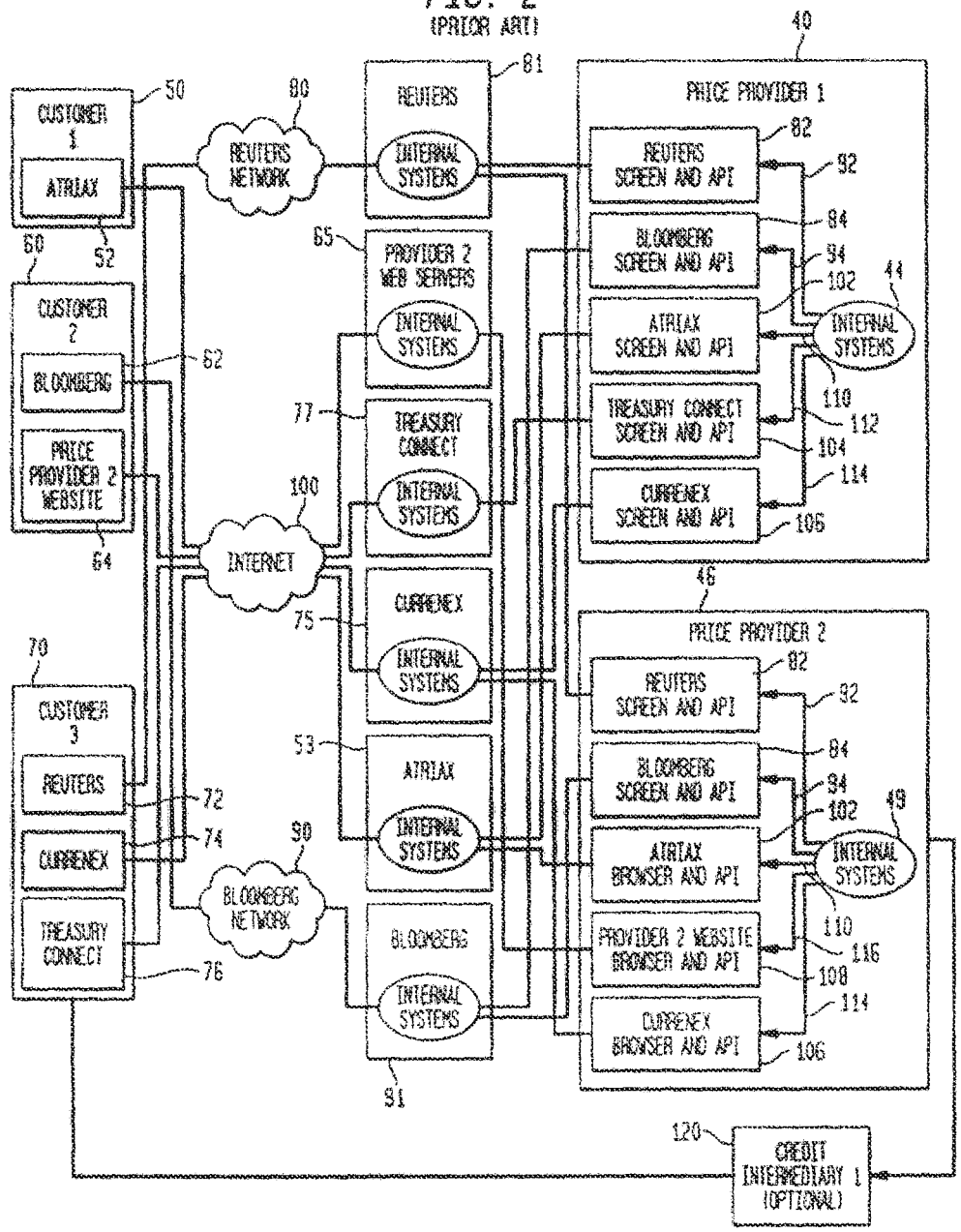
FIG. 2 depicts an example of the various relationships among customers, portals, and price providers according to the prior art and the multiple interconnections that are required between the price providers and portals.

Significantly though, in contrast to the arrangement in the prior art system of FIG. 2, there is no need for each of the portals' data centers 220, 223, 226, 229, 232, 235. Instead, in this embodiment, each of the portals 52, 62, 64, 72, 74, 76 connects through a respective gateway 222, 225, 228, 231, 234, 237 to a single point or hub which may be referred to as a Central Router 240. Although the gateways 222, 225, 228, 231, 234, 237 are shown as separate blocks, one or more of these gateways may be implemented in a single connect box. Central Router 240, which may be operated by a third party, a carrier network such as Global Crossings, Inc, or some other entity, routes data to Price Providers 1 and 2 40, 46 and any credit intermediary 241 who are likewise connected to Central Router 240. Gateways 222, 225, 228, 231, 234, 237 normalize the data before it is forwarded to the Central Router 240 from portal-specific (possibly proprietary) formats (and communication protocols) to a standardized format (and communications protocols) for those portal-specific data formats that are not substantially identical to any standardized data format. The standardized format into which the data is translated and gateways 222, 225, 228, 231, 234, 237 for the data normalization may be a newly developed format, or may be an existing format such as TOF that is selected as the standard into which data is normalized. After the data is normalized, the Central Router 240 aggregates the data streams from the multiple gateways 222, 225, 228, 231, 234, 237 into a single data stream that can be routed to the price providers 40, 46 or credit intermediary 241. It is the normalization process that enables the aggregation of the data streams. Data enters price providers' 40, 46 and credit intermediary's 241 internal systems 244, 247, 249 through a respective application program interface (API) 242, 245, 248 at each of price providers 40, 46 and credit intermediary 241. The data may be routed to Super-Monitors, described below, at price providers 40, 46 in addition to being routable to internal systems 244, 247, 249.

Data to be communicated in the opposite direction from the Price Providers 1 and 2 40, 46 to Customers 1-3 50, 60, 70 must be translated ("denormalized") from the standardized format (and communication protocols) into a portal-specific data format (and communication protocols) for the portal through which the data will be directed. Data may also be directed between the portals' data centers 220, 223, 226, 229, 232, 235, price providers 40, 46 and the credit intermediary 241 via the Central Router 240. The type of information that is included within the data that is exchanged between Customer 1, Price Provider 1, Price Provider 2 and Credit Intermediary 1 will depend on the type of transaction involved and the particular point in the transaction at which data is being exchanged.

While FIG. 4 shows one system configuration for normalizing and aggregating data, and vice versa, in other embodiments, the system configuration may be different such that the normalization and aggregation are implemented in locations other than the locations shown in FIG. 4. The normalization is generally performed at a point between the internal systems of the various portals' data centers and the internal systems or SuperMonitor of the price providers (the internal systems only for the credit intermediary). FIGS. 5-8 show examples of significant portions of some of the various different system configurations in which various hardware (and associated software) is installed between the portals' internal systems and the price provider(s) (and credit intermediary's) internal systems to perform the normalization/denormalization.

Figure 5:
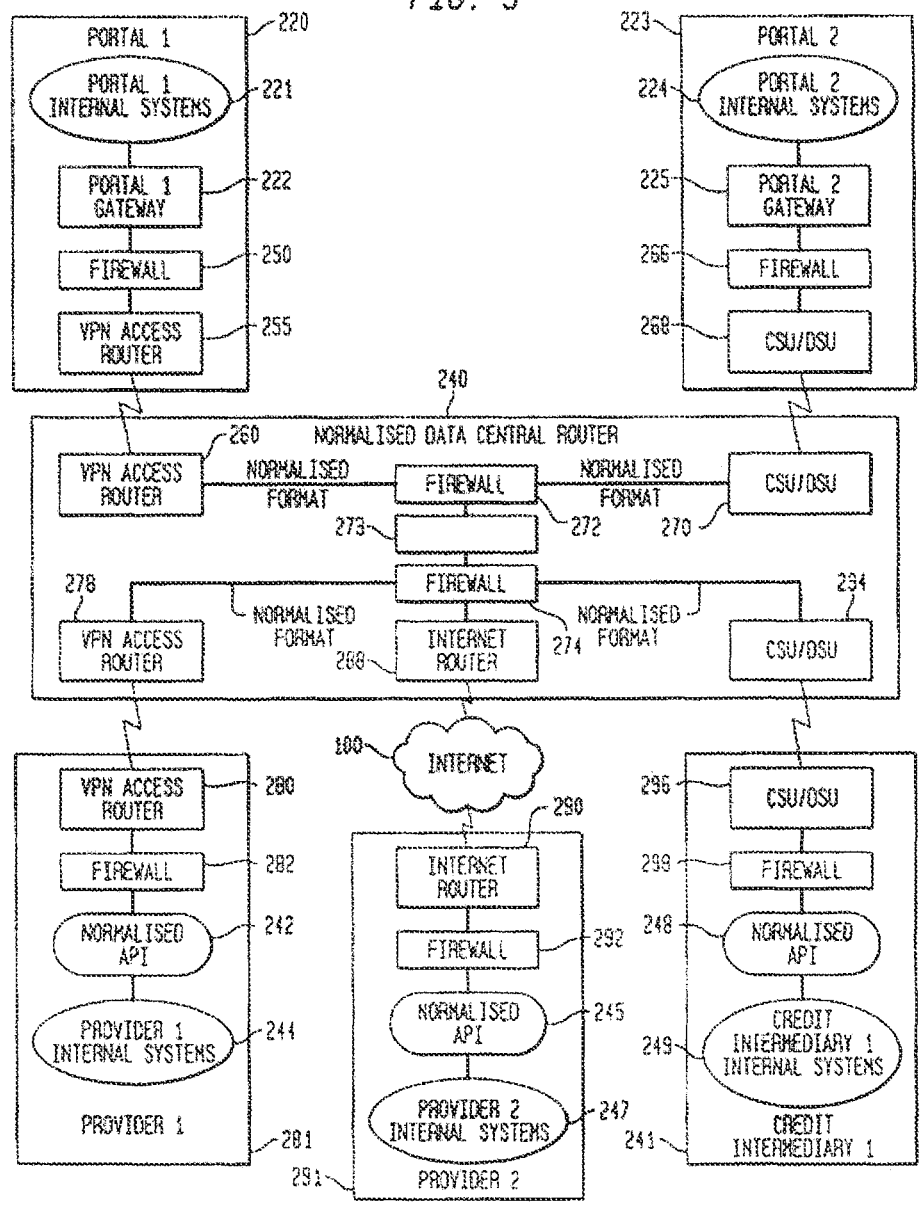
FIG. 5 depicts a first example of a system configuration for implementing the present invention in which the normalization of data is performed at the portals' data centers, the system configuration reflecting an example of the system configuration that may be implemented in the system of FIG. 4.

FIG. 5 illustrates one possible system configuration which can be used to implement the system of FIG. 4. In this embodiment, internal systems 221 of Portal 1 220 are connected to a Central Router 240 via gateway 222, a device 250 having a firewall (or "firewall device") to prevent unauthorized access, and a VPN (virtual private network) Access Router 255. Gateway 222 normalizes the data from Portal 1's internal systems 221. VPN Access Router 255 connects to a VPN Access Router 260 at Central Router 240, through dedicated lines or any communication network. Internal systems 224 of Portal 2 223 are similarly connected to Central Router 240 via a gateway 225, a firewall 266, and a CSU/DSU (Channel Service Unit/Data Service Unit) 268, which connects to another CSU/DSU 270 at Central Router 240. Data from Portal 2's internal systems 224 is normalized at gateway 225.

The normalized data from both portals 221, 223 comes through firewall 272 to prevent unauthorized access to the Central Router 240 and is aggregated into a single data stream at a communications device 273 that has the capability of aggregating multiple incoming streams of data from the portals into a single outgoing data stream. Device 273 thus serves as a central transit point for all data passing between portals 1 and 2 220, 223, price providers 1 and 2 281, 291, and credit intermediary 1 241. Device 273 routes the single data stream through a second firewall 274 at Central Router 252 after which the data is routed to the appropriate destinations, whether to price provider 281, price provider 291, or the credit intermediary 241, if any. Data enters price provider 281's systems through a VPN Access Router 278 and is transmitted to a VPN Access Router 280 at price provider 281 (via a communications network). From there, the data passes through a firewall 282, an API 242 and into price provider 1's internal systems 244. Data for price provider 291 is transmitted through an Internet Router 288 and the Internet 100 to an Internet Router 290 at price provider 291 and through a firewall 292, price provider 2 API 245, and to price provider 2's internal systems 247. Data is routed to the credit intermediary 241 through CSU/DSU 294 at Central Router 252. The data passes through another CSU/DSU 296 at credit intermediary 241, a firewall 298, credit intermediary API 248, and then to credit intermediary's internal systems 249.

Figure 6:
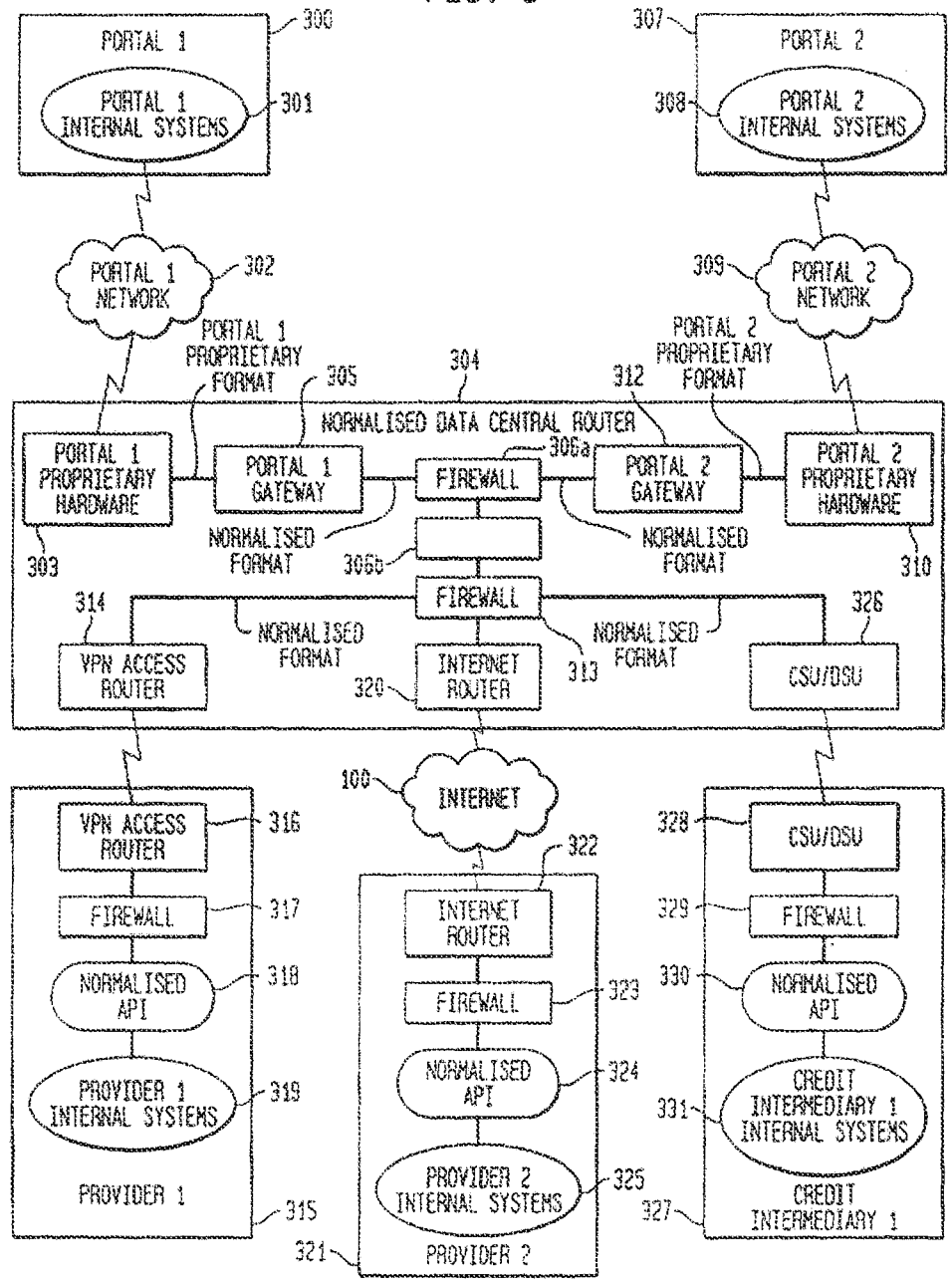
FIG. 6 depicts a second example of a system configuration for implementing the present invention in which the normalization of data is performed at a Central Router intermediate the portals and price providers.

FIG. 6 shows another possible system configuration which can be used to implement the invention. However, this embodiment differs from the embodiment shown in FIGS. 4 and 5. In this system, the gateways are not at the portals. Instead, the data is normalized at gateways at Central Router 304. Data from portal 1 300 is sent from internal systems 301 through the portal 1 network 302 and portal 1 hardware 303 that interfaces with portal 1 300. The data is routed to a gateway 305 in Central Router 304 where it is normalized. Similarly, data from internal systems 308 at portal 2 307 is transmitted to hardware 310 at Central Router 304. This portal 2 data is routed to a second gateway 312 where this data is normalized. The normalized data from portals 1 and 2 300, 307 is routed through a firewall 306a, and is then aggregated at a communications device 306b that has the capability of aggregating multiple incoming streams of data from the portals into a single outgoing data stream. Device 273 thus serves as a central transit point for all data passing between portals 1 and 2 300, 307, price providers 1 and 2 315, 321, and credit intermediary 1 327. The data is then routed through a device 313 having a second firewall to prevent unauthorized access on the price provider/credit intermediary side, and onto price providers 315, 321. Data for price provider 1 315 is routed through VPN access router 314 and over a communications network to a VPN access router 316. It then passes through a firewall device 317, an API 318 and into price provider 1 315's internal system 319. Data for price provider 2 321 is routed through Internet Router 320 at Central Router 304, over the Internet 100, through Internet Router 322 at price provider 2 321, firewall device 323, an API for price provider 2 324, and to internal systems at price provider 2 325. Credit intermediary 327 receives trade details that are transmitted from a source such as price provider 1 315, price provider 2 321, portal 1, 300, or portal 2 307 in a normalized state through firewall 313, through CSU/DSU 326 at Central Router 304, over a communications network, through CSU/DSU 328 at credit intermediary 327, through firewall device 329, and into the credit intermediary's internal systems 331.

Figure 7:
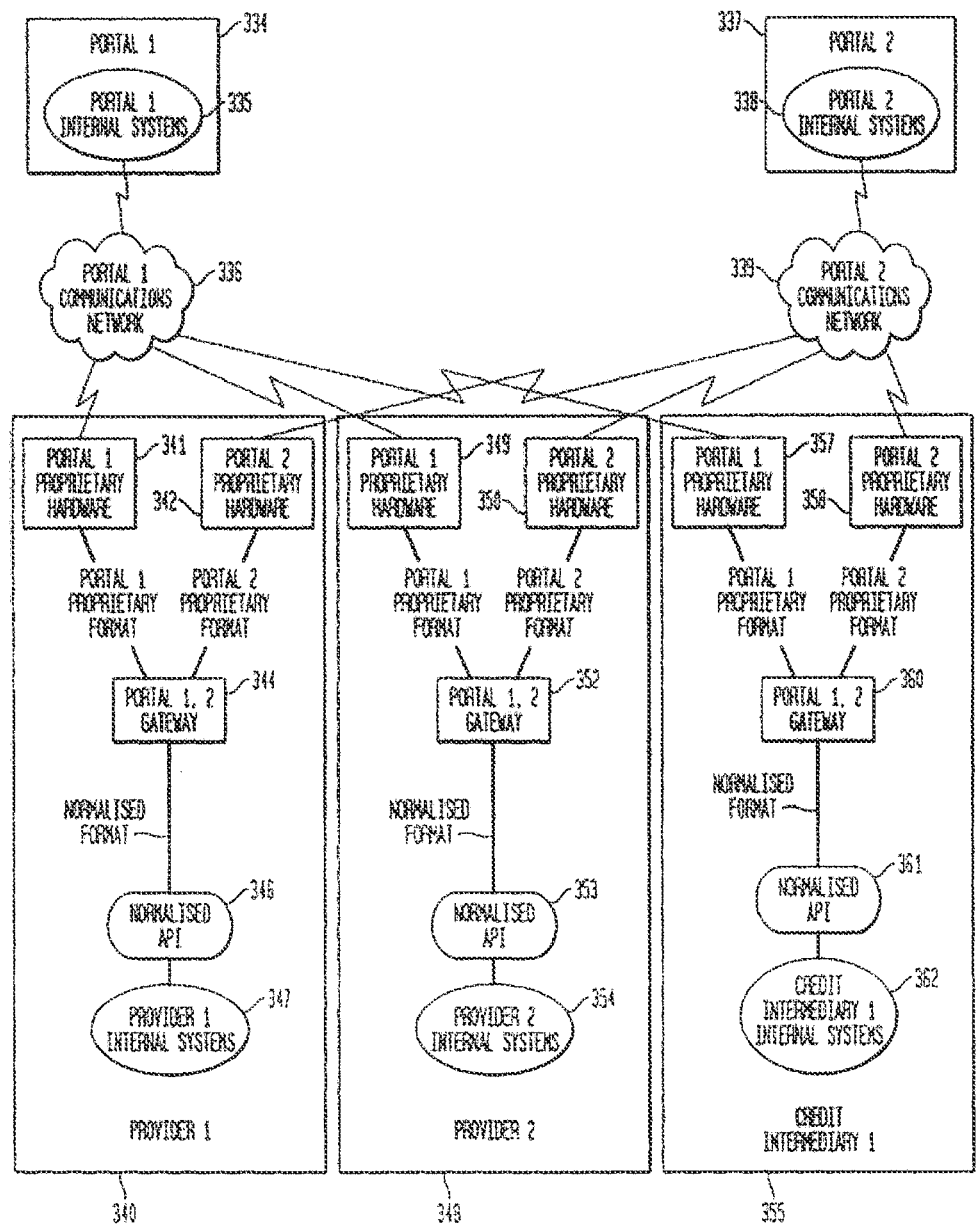
FIG. 7 depicts a third example of a system configuration for implementing the present invention in which the normalization of data is performed at the price providers.

FIG. 7 illustrates another possible system configuration for implementing the invention. In this implementation, Portals 1 and 2 334, 337 communicate with the price providers 340, 348 and credit intermediary 355 directly using their respective communications networks 336, 339.

The portals 334, 337 supply each of the price providers 340, 348 and credit intermediary 355 with proprietary hardware 341, 342 at price provider 1 340, hardware 348, 355 at price provider 2 348, and hardware 357, 358 at credit intermediary 355 to interface with the portals 334, 337. At price provider 340, the data from both portals 334, 337 is fed into a first gateway 344 where the data is normalized and aggregated into a single outgoing data stream. Gateway 344 thus serves as the central transit point for communications between a particular price provider and the various portals, but communications between price providers 340, 348, and credit intermediary 355 must pass through one of the portal communication networks 336, 339. The data is then forwarded to API 346 to interface with price provider 1's internal systems 346. At price provider 2 348, the data from both portals 334, 337 is aggregated into gateway 352 where the data is normalized, and forwarded to API 353 to interface with price provider 1's internal systems 354. At credit intermediary 355, the data from both price providers 340, 348 (and portals 334, 337, if any data is sent in this direction) is aggregated at gateway 360 where the data is normalized, and forwarded to API 361 to interface with the credit intermediary's internal systems 362.

Figure 8:
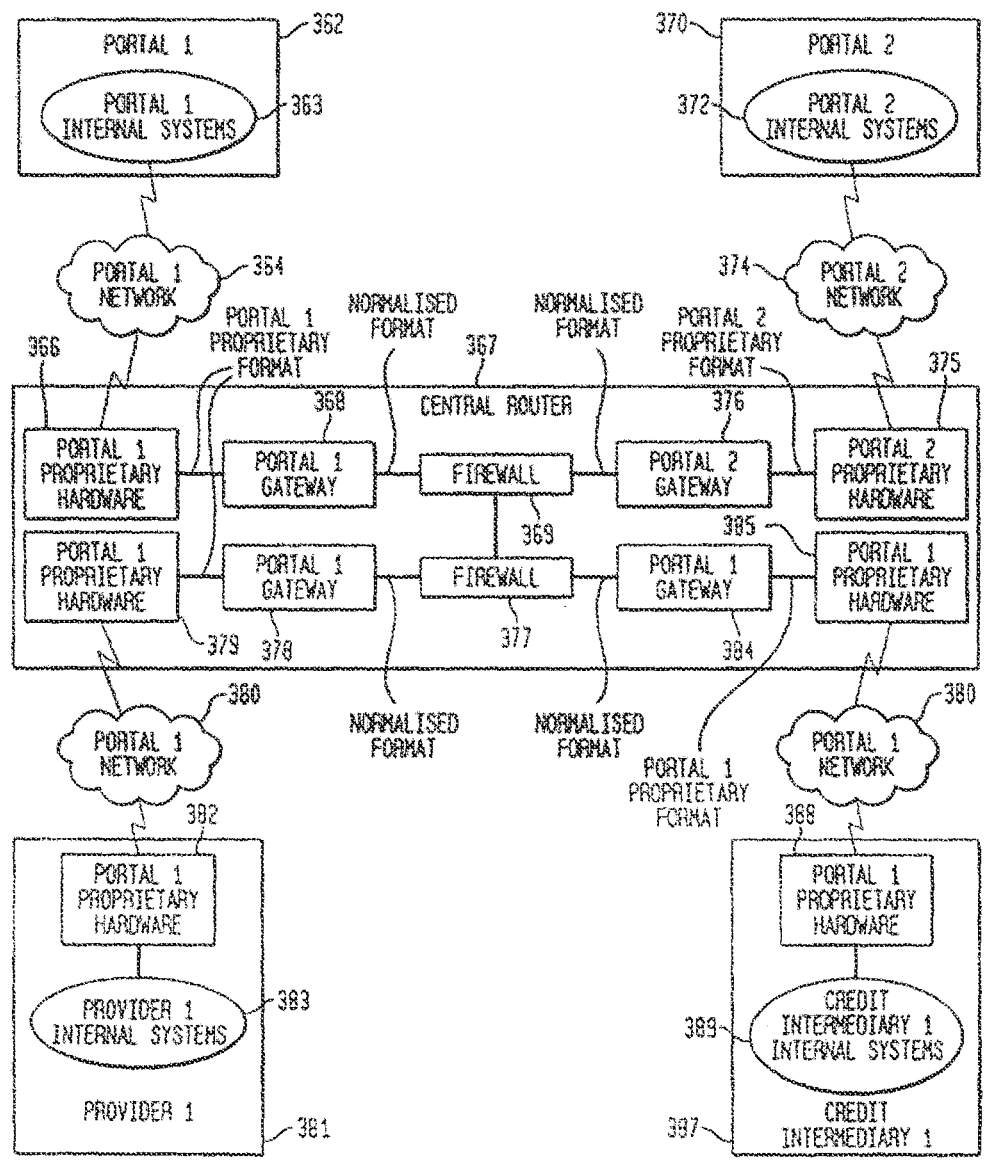
FIG. 8 depicts a fourth example of a system configuration for implementing the present invention in which the normalization of data is performed at the Central Router intermediate the portals and price providers to combine data streams from customers of Portals 1 and 2 and the data is then returned to a proprietary format of a single portal over which it will be sent for outbound transmission.

FIG. 8 illustrates yet another possible system configuration for implementing the invention. In this embodiment, data from Portals 1 and 2 362, 370 is normalized at a Central Router 367, the data from both portal 1 and 2 362, 370 is aggregated and the data is then translated (denormalized) at the Central Router 367 to the chosen format of one or more price providers, only one of which is shown in this figure— price provider 381. In this embodiment, data passing between price provider 381, portal 1 362, portal 2 370, and credit intermediary 387 is also normalized first at Central Router 367 and the denormalized there too before sent to its destination. More particularly, data passes from portal 1 362's internal systems to a portal 1 network 364 and to hardware 366 for portal 1 at Central Router 367. The data at this point is still in the portal 1 format. The data is normalized at gateway 368 and passes through firewall device 369a. Additionally, data passes from portal 2 370's internal systems 372 to a portal 2 network 374 and to hardware 375 at Central Router 367. The data from portal 2 370 at this point is still in the portal 2 format. The data from portal 2 370 is normalized at gateway 376 and also passes through firewall device 369. The data from the two portals 362, 370 is then aggregated at communications device 369b, which serves as a central transit point for the data, and routed through firewall 377 and to price provider 381 and/or credit intermediary 387 as appropriate. The data for the price provider from both portals is denormalized at gateway 378 at Central Router 367 into the format used by price provider 381's internal systems which in the illustrated example happens to be the format of portal 1 362. The now denormalized data passes from gateway 378 to hardware 379 at Central Router 367 and then over network 380 to hardware 382 at price provider 381 and to price provider's internal systems 383. Data regarding trades may be sent from price provider 381, portal 1 362, or portal 2 370 to credit intermediary through portal 1 network 380, hardware 379 at Central Router 367, gateway 378 where the data is normalized, firewall 377, gateway 384 where the data is denormalized, hardware 385 at Central Router 367, and portal 1 network 380, to hardware 388 at credit intermediary 387 and to internal systems 389.

It should be understood that although the data may be described as passing in a particular direction, the data can also be transmitted in an opposite direction and, in that case, the respective gateways that normalized or denormalized the data as appropriate performs the reverse process, viz., the data is denormalized or normalized, for data in the opposite direction from the direction described. It should be further understood that one or more of the gateways illustrated in the embodiments shown in FIGS. 5-8 or in any embodiment not specifically illustrated herein may be implemented in a single connect box or in any hardware not solely devoted to normalizing data.

The normalization of the data from portal-specific formats generally entails rationalizing the data, if necessary, by eliminating redundancy and ambiguity in the data, and translating the data into a single standardized format that can be presented to a price provider. This standardized format may be, but need not be, for example, an existing format used by one or more of the portals such as TOF, FIX, FPML, or FinXML. The normalization also transforms the data from the communication protocol of the portals, such as the TCP/IP protocol of a Web-based portal, to the preferred protocol of the price provider. The normalization requires appropriate data mapping software ("translation software") for mapping data in an incoming data stream from a portal-specific format to a standardized format and vice versa and look-up tables (LUTs) for effecting the normalization/translation. The LUTs are located in what is termed herein a "gateway", which can be located anywhere in the system. The LUTs indicate how data should be mapped from one format to a different format. The data is output from the gateway as a data stream that is in a standardized format.

In the embodiment of FIG. 4, the price providers use the same protocol and data formats as the format into which the data is normalized at least for purposes of processing the data to be displayed at a monitor or for entry into an automatic pricing engine. Thus, the price providers can communicate freely through the Central Router 240 without the need for any further changing of data formats and protocols, unless the data is to be translated into another proprietary format at a price provider in order to be compatible with the price provider's systems, which may be legacy systems that are not compatible with the standardized format. An example of this latter possibility is described above with respect to FIG. 8 in which the price providers' systems are designed to read the formats of only certain portal's system.

FIG. 9 depicts an example of the normalization of an electronic communication incoming from two different portals in different formats. Customer 1 contacts Price Provider 1 via Portal 1 and Customer 2 contacts Price Provider 1 but via Portal 2. Customer 1 types in at terminal 390 using Proprietary Interface 1, which is proprietary to Portal 1, that he wishes to buy $10 million in US dollars of Japanese Yen on the spot market, as shown at block 391a. This message is captured in a data format Proprietary Format 1 as is shown at block 391b and transmitted to Portal 1 392. Portal 1 392 transmits this message through the Portal 1 Gateway 393 where the price request message is translated into a normalized format 391c. This translation includes, among other things, the translation of the tenor spot that is in a proprietary format into an explicit value date (May 1, 2001). This message is then forwarded in its normalized format to a price provider 394.

Customer 2 also contacts Price Provider 1 with the same price request at terminal 395 using Proprietary Interface 2, which is proprietary to Portal 2. However, as is shown at block 396a, the price request at Proprietary Interface 2 has a different appearance than Proprietary Interface 1 and a different data format. For example, the date of the price request is captured at Proprietary Interface 2. Customer 2's request is captured in Proprietary Format 2 as is shown at block 396*b* and is forwarded to Portal 2 397. It is transmitted through the Portal 2 Gateway 398 and is normalized there into a format as is shown in block 396*c* which is identical to the format into which Customer 1's request has been normalized, as shown in block 391*c*. This message is also forwarded in its normalized format to price provider 394.

All pertinent trade details will be collected during normalization such as: the name of the institution and/or individual calling; the mechanism of call (e.g., proprietary Web server, Currenex Web site, Reuters dealing machine, and the like); the commodity/asset class; asset details sufficient to identify each class of asset; quantity to be traded; counter-party; the dates relevant to a trade, such as the rate reset date for a swap; conventions pertaining to the transaction class; relevant index details, such as the floating rate index for an index rate swap or the London gold PM fix for a gold transaction; an indication of whether transaction will be physically or financially settled; and the like. It should be understood that is only an example of details that may be collected and normalized, but it is by no means an exhaustive list. In normalizing the trade data, no details should be discarded which are required in order to maintain all information provided by the customer and which permit the price provider to respond to incoming data from a respective portal.

The normalization of the data and subsequent electronic receipt of all details of the transaction by a price provider in a universal standardized format enables the data streams from the various portals to be combined at a price provider for unified display on a trader's monitor. The trader may be provided with a single interface, which may be termed a "Supermonitor", where he can manually respond to all customer requests, regardless of the portal used by the customer to access the price provider. The price provider can thereby monitor all price quote requests, price quotes that it provided and details of completed trades at a single display if it wishes. The price provider can also use the displayed information for various purposes, such as to determine whether or not to manually withdraw outstanding price quotes to certain customers.

Where the price provider utilizes an automated pricing engine to generate prices that are then transmitted to customers, the combined data streams enable the price provider to centrally manage the price quotes and trading, including the centralized management of risk. Once a trade is made, the trade details can also be fed in the standardized format at the price provider to the price provider's internal computer systems, and to a credit intermediary's systems, if there is one.

The various gateways, Central Router, and SuperMonitors may be developed and operated by a single central entity. For example, they may be developed by a third party, a particular counterpart, one of the portal operators, or a consortium of these constituencies. The standardized data format may also be developed and/or chosen by this entity.

Figure 10A:
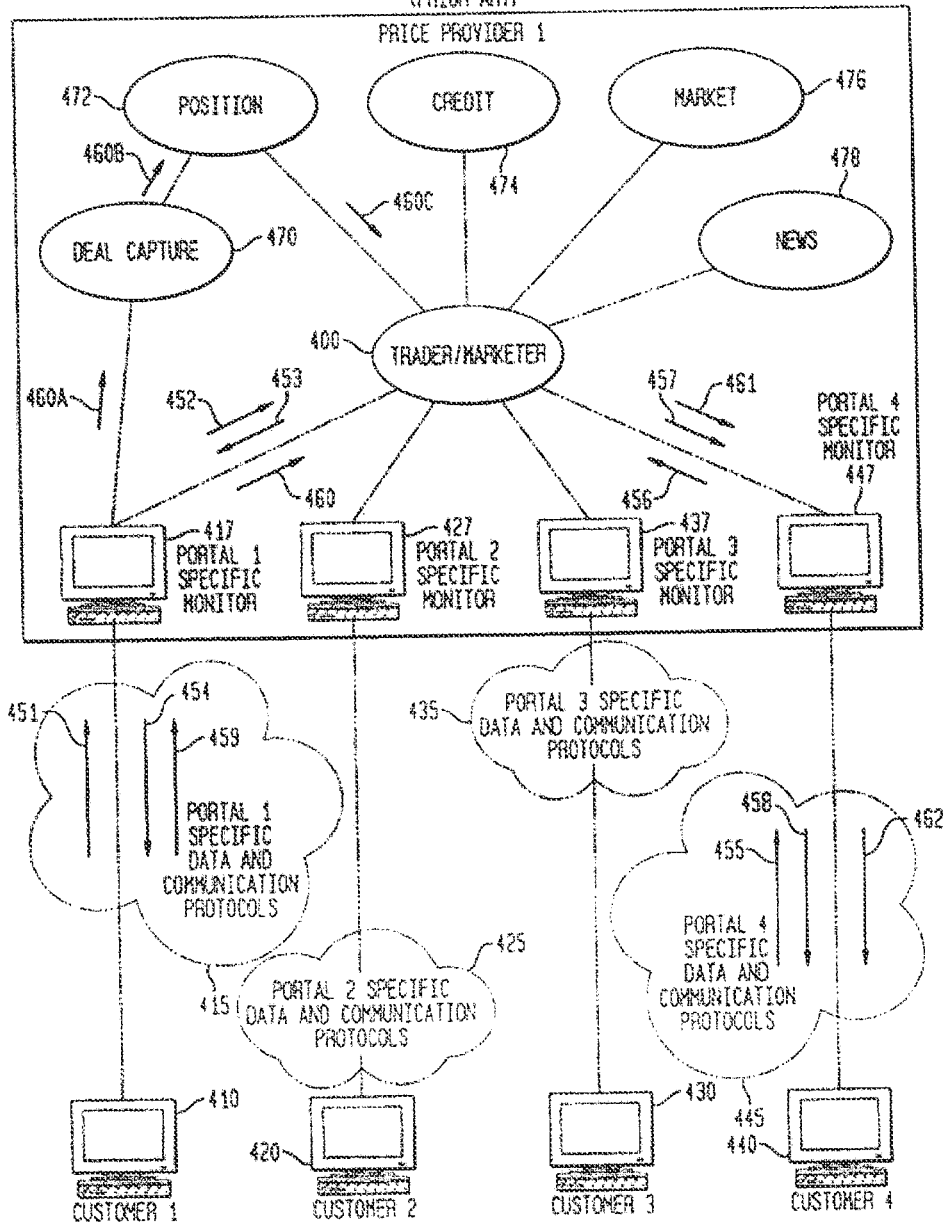
FIG. 10A is a block diagram depicting an example of a prior art system in which a trader at a price provider monitors and interact with multiple work stations, each having a set of portal-specific graphical user interfaces and depicting a sample data flow between the customers and price provider.
Figure 10B:
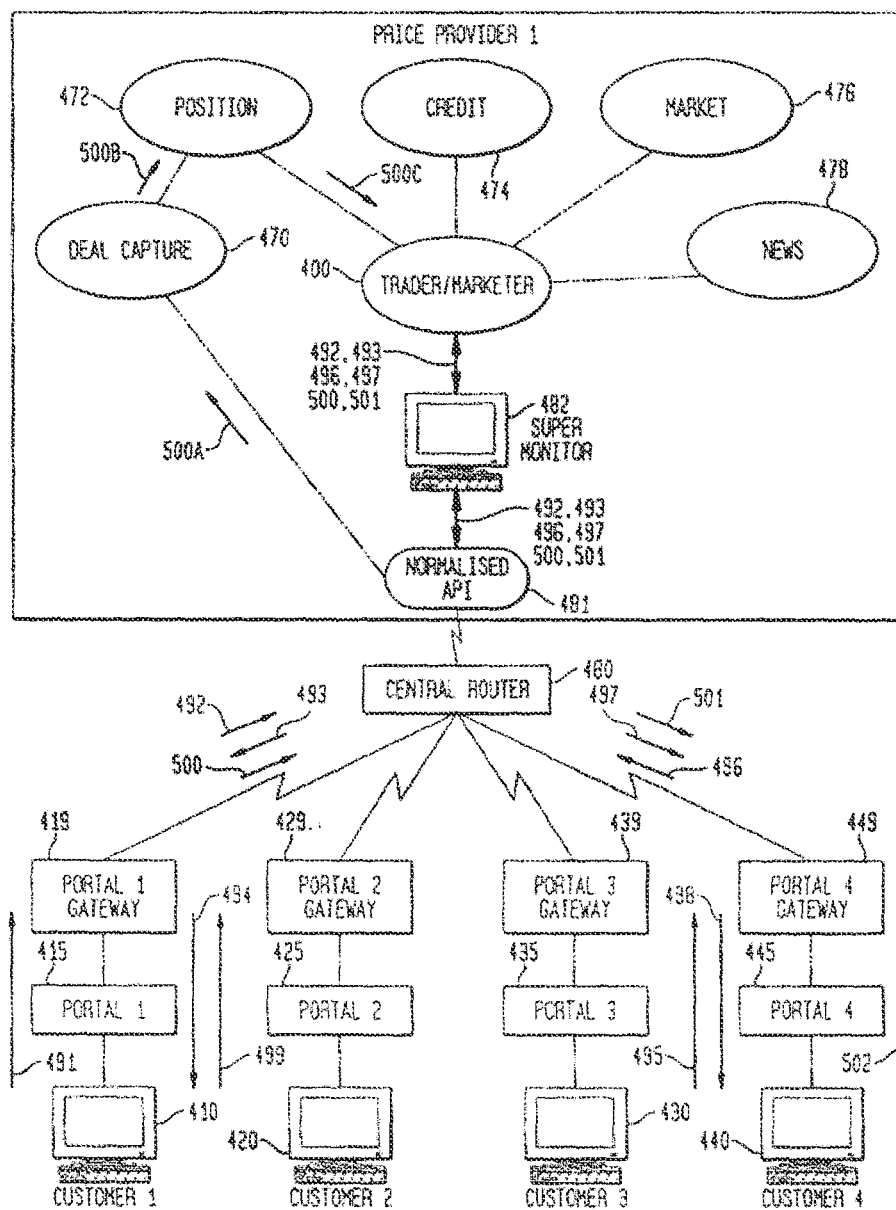
FIG. 10B is a block diagram analogous to the system of FIG. 10A but where the data from the multiple portals is normalized before it is transmitted to the price providers so that the data from the multiple portals can be monitored and interacted with at a single monitor.

The advantages of normalizing the data from the portals are now illustrated by an example in which the system configuration and steps required for trading in a prior art embodiment of FIG. 10A are compared to the streamlined system configuration and steps required in an embodiment illustrated in FIG. 10B.

FIG. 10A illustrates the prior art system for customers 1-4 who utilize respective terminals 410, 420, 430, 440 to communicate with a trader 400 at the price provider through respective portals 415, 425, 435, 445 that each have their own specific data formats and communication protocols. Portals 1-4 415, 425, 435, and 445 present the trader 400 with four different graphical user interfaces to a trader who must monitor the interfaces separately at respective monitors 417, 427, 437, 447 (or at separate windows on a single monitor). The portals may connect to the price provider via private networks or public networks, such as the Internet.

Customer 1 requests a price quote using a terminal 410 (step 451). The request is transmitted through Portal 1 415 to the trader 400 (step 452) who views the price request on monitor 417. The trader 400 decides whether to quote a price and, if so, what price. The trader's decision can take into account the price provider's position in the financial instrument or other tradable item and factors other than the price provider's position such as the creditworthiness of a Customer 1, Customer 1's existing credit line usage (which the trader 400 may be able to look up at an internal credit monitoring platform 474), the current state of the market for the product, recent market activity, and market sentiment 476 and recent political or economic news which may be fed through various feeds 478 to the trader 400. The trader 400 then sends a price quote to Customer 1 (step 453) through Portal 1 415 and the price quote is transmitted to Customer 1 (step 454).

While the price quote to Customer 1 remains outstanding, Customer 4 requests a price quote for the same product as customer 1 through terminal 440 (step 455). This request is transmitted through Portal 4 445 to trader 400 (step 456) where the trader receives the request on monitor 447. The trader 400 responds with a price quote which may or may not be the same as the first price quote depending on essentially the same factors as the first price quote (step 457). This second price quote is transmitted through Portal 4 445 back to customer 4 (step 458). Customer 1 then decides to send a message accepting the first price quote (step 459), and the message is transmitted to the trader 400 to alert the trader 400 to the deal execution (step 460). The deal (trade) details are captured manually at 470 (step 460A) from trading interface 417, the deal details are incorporated to yet another display at the trader 400 showing him his new position 472 on the product traded, including the current dealt positions and inventory of his trading book (step 460B), and the trader 400 can then incorporate the new deal into his decision process as to whether to quote a price and what price to quote (step 460C). If the trader decides to now change the price quoted to Customer 4, he must retract the old price and enter a new price into trading interface 447 (step 461) and this new price must be forwarded to Customer 4 (step 462) before Customer 4 may or may not execute a deal based on the previous price quote.

The risks of using the system of FIG. 10A include that the trader 400 may misread or delay reading the price requests, or may incorrectly enter a price or enter it too slowly. Any mistakes may be costly and the risks grow with the increasing number of trader interfaces. In addition to the market and trader workflow risks, there are costs associated with the installation, integration, training, maintenance and support of the variety of trading platforms. There are also risks of errors and costs in having to manually perform back office tasks at the price providers.

FIG. 10B illustrates how the same task can be accomplished in a streamlined fashion while ameliorating the various risks inherent in the system of FIG. 10A using a system implemented according to the present invention. Customers 1-4 communicate with the price provider using respective terminals 410, 420, 430, 440. Each customer accesses the price provider using a different portal. A respective gateway 419, 429, 439, 449 is added on the price provider side of each portal where the outgoing data is normalized and data incoming from the price provider to the customer is translated from the standardized format and protocol into the portal-specific format and protocol. Communications from each portal are routed through the respective gateways 419, 429, 439, 449 to a Central Router 480 where the data is routed to the price providers, such as to Price Provider 1's API 481. The communications between gateways 419, 429, 439, 449 and Central Router 480 and between Central Router 480 and API 481 may occur over private data lines or over a carrier network. API 481 routes the data to a SuperMonitor 482 at which the trader 400 can view on a graphical user interface price requests from and other data that is exchanged with Customers 1-4.

In the embodiment of FIG. 10B, Customer 1 sends a price request (step 491) which is transmitted to the trader 400 at the price provider through Portal 1 415, gateway 419, Central Router 480 and API 481 for display on SuperMonitor 482 (step 492). By looking at the single interface where all outstanding price quotes are displayed and on which the trader's position, credit and market risk information and news may be displayed, the trader 400 makes a price and enters it into the SuperMonitor's standard interface 482 from where it is transmitted back to Customer 1 through API 481, Central Router 480, and gateway 419 (step 493) to Portal 1 and ultimately to Customer 1 (step 494).

Customer 4 then requests a price for the same product but over a different portal. This request is transmitted via Portal 4 445 to Portal 4 Gateway 449 (step 495) and from there to Central Router 480, API 481 and SuperMonitor 482 (step 496). The trader 400 makes a price and transmits it to Customer 4 (steps 497, 498). Customer 1 then sends a message to the trader 400 that he accepts the deal (step 499) and the deal is executed (step 500). The deal details are automatically captured at 470 (step 500A) from API 481, and are incorporated to the information displayed on SuperMonitor 482 to the trader 400 showing the trader his new position 472 on the product traded, including the current dealt positions and inventory of his trading book (step 500B). The trader 400 can then incorporate the deal into his decision process as to whether to quote a price and what price to quote (step 500C). The trader can make a new price (and thereby withdraw the previous price quote), if necessary, for Customer 4 (step 501) and transmit the price to Customer 4 (step 502). In this scenario, the trader 400 is far less likely to incorrectly enter a price or to enter it too slowly because his attention is devoted to a single monitor, and because he is alerted to all trades at a single interface with which he can become well-acquainted. He is therefore less likely to misinterpret or interpret too slowly a trade execution alert. The implementation is also less costly. While interaction with a single price provider is shown in FIG. 10B, it should be understood that multiple price providers can be linked to the same customers through Central Router 480.

The trade details of the trade between the price provider and customer 1 may be automatically reported to a credit intermediary (not shown on FIG. 10B) if there is any credit intermediary. These details may be transmitted from the price provider to the credit intermediary or may be left to a particular portal to report to the credit intermediary.

Figure 11A:
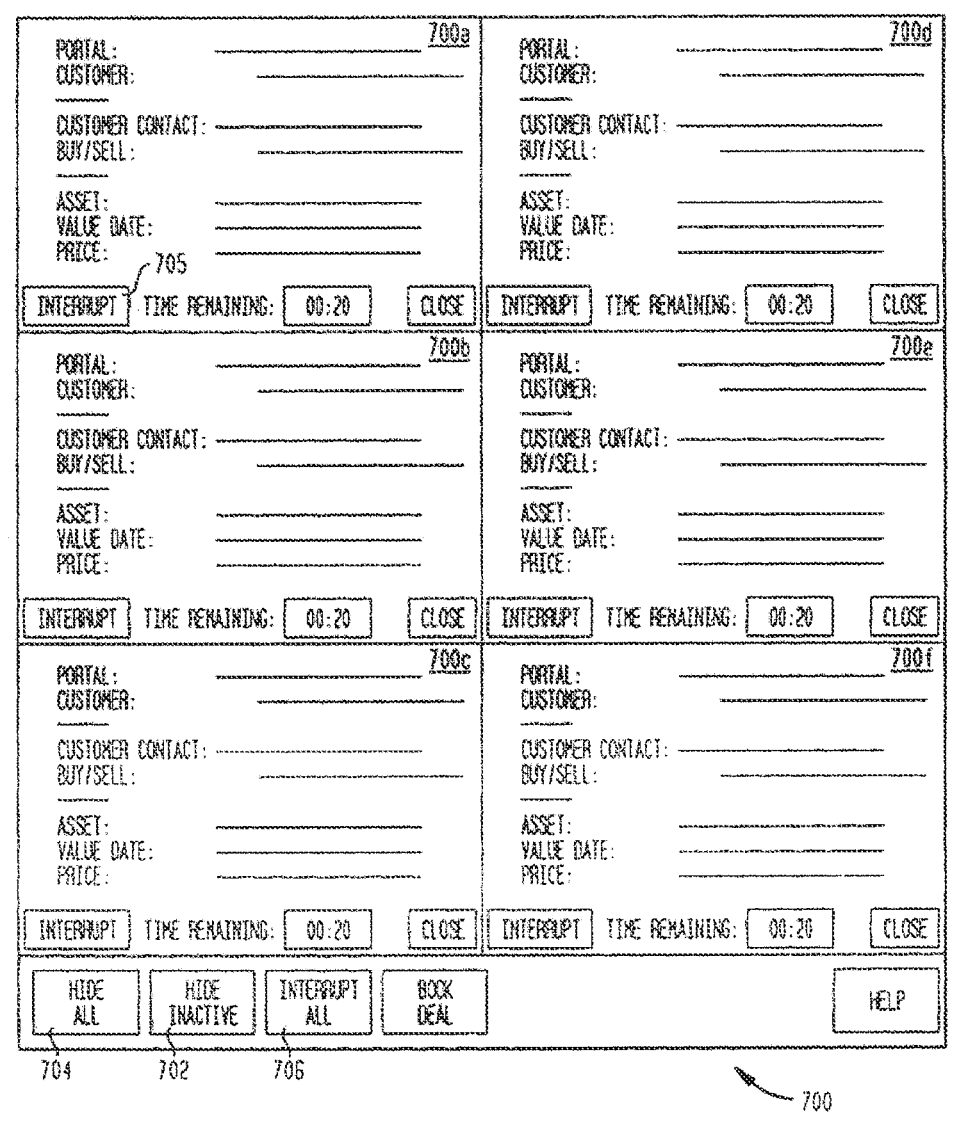

The interface screen 700 at the SuperMonitor 482 may take any one of a number of forms, but will typically be a graphical user interface in FIG. 11A having multiple windows 700a-700f, each window being for a different open price quote request and price quote, if any. To conserve screen space, windows representative of inactive portals may be hidden by clicking on a "Hide Inactive" selection button 702. All windows can be hidden by clicking on a "Hide All" selection button 704.

The windows 700a-700f present standard fields and features. Each window may indicate the portal from which the request derived, and other information such as the name of the customer, a particular customer contact, the asset to be exchanged, whether the price quote is for a buy or sell and whether the price quote is 1 way or 2 way, the value date of the trade, the price quoted, an interrupt box such as interrupt box 705 which can be selected if it is desired to withdraw the price quote, and a timer to time how long the price quote has been open. An "interrupt all" selection box 706 may be used to withdraw all outstanding price quotes that have not been accepted. The "Book Deal" selection box 708 is clicked on to book a deal while a user has selected a particular window of windows 700a-700f.

Other types of information provided by the various portals should generally be made available at windows 700a-700f to provide an interface that offers the full functionality of the various portals while maintaining substantially the same look and feel in each of windows 700a-700f. Because some portals offer features that other portals do not, the feature that is not offered or is inapplicable is grayed-out or hidden in a particular window. The software can be set to allow for keystrokes to apply to all frames or just those that can accept the given command.

The interface of FIG. 11A will support many features of the individual portal windows therein. Such features include allowing a conversation between the price provider and the individual calling; creation of a trade ticket, based on either a conversation between the individual calling and the price provider or based on the trade details electronically received in the window; an interrupt feature and a control of who owns a price; pricing aging, in order to define for how long a particular price is good; an audit trail of keystrokes for each transaction; a credit calculator, which extracts the trade details and, by reference to internal credit systems, automatically returns a credit result; booking a transaction; and the like. Such features may be automatically performed or invoked by the price provider. For example, a credit check could be performed automatically for every new call received while booking a transaction might occur only upon the price provider's acknowledgement of a confirmed trade.

Figure 11B:
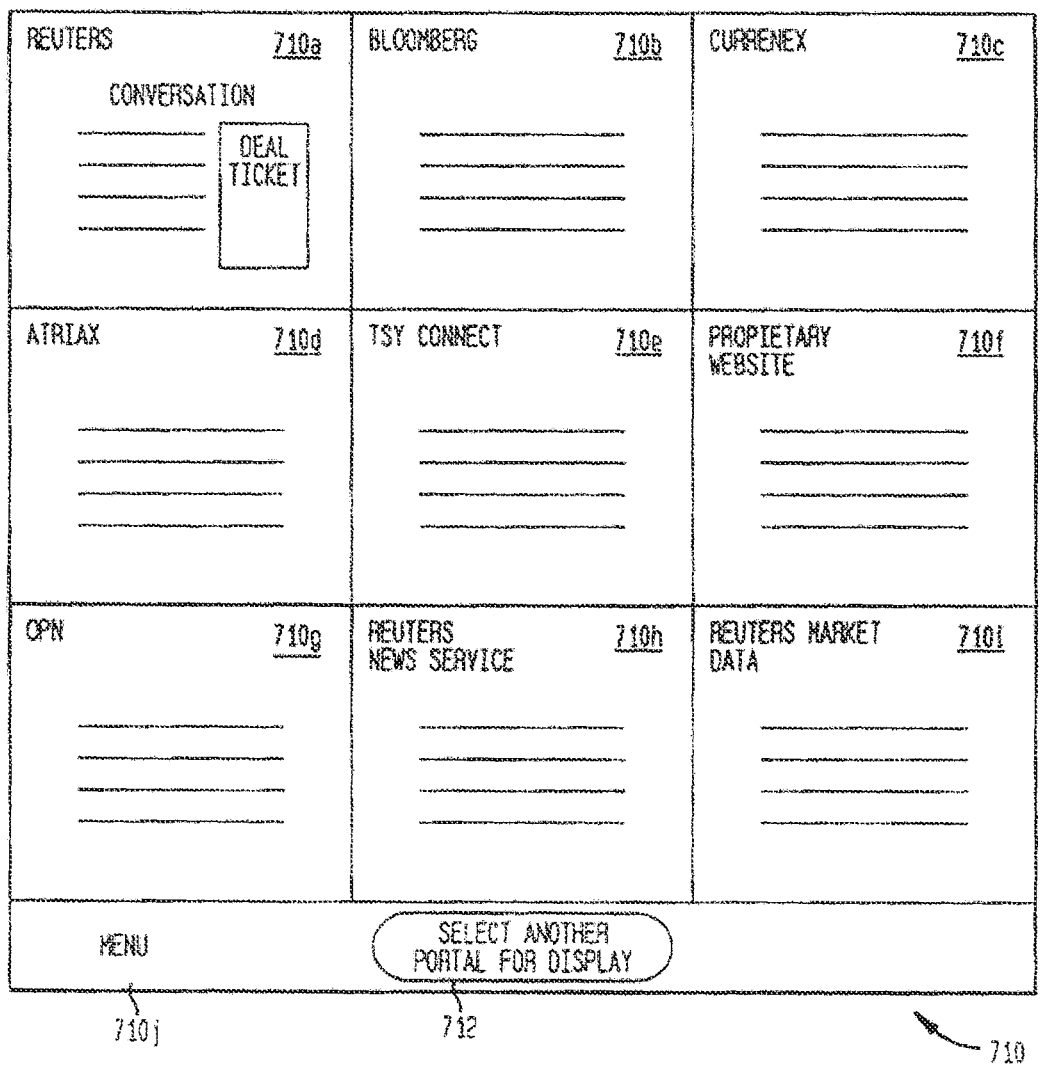
FIG. 11B is sample screen at a price provider according to one embodiment of the invention on which data from multiple portals is displayed according to the usual graphical user interface of each portal.

FIG. 11B shows an alternative embodiment to the interface of FIG. 11A in which the graphical user interface at Supermonitor 482 looks like interface screen 710. In this embodiment, the screen 710 comprises tiled windows 710a-710g, each of which presents trade details for price quotes and trades exchanged with customers through that portal. For example, window 710a may show data exchanged with the Reuters network 80, window 710b may show data exchanged with the Bloomberg network 90, window 710c may show data exchanged with the Currenex Web site, window 710d may show data exchanged with the Atriax Web site, window 710e may show data exchanged with the TSY Connect network, window 710f may show data exchanged with the Price Provider 2 Web site 64, and window 710g may show data exchanged with the Internet 100. Additional windows may be displayed on the display at same time to display other information such as incoming Reuters news data in window 710h and Reuters market data in window 710i. In this embodiment, a trader at the price provider can simply activate a window, such as by clicking on it with a pointing device like a mouse, and uses the terminal's keyboard to input whatever data and commands that are necessary. Preferably, the tiled windows retain the look and feel of the actual portal's interface as well as all of the portal's functionality. The commands for all windows should be adapted to be universal for all portal windows. Alternatively, the interface includes one control window, such as window 710*j* which provides the price provider (e.g., the trader) with a menu of commands including the ability to select one or more portal windows (and thereby transactions) on which to act. The control window 710*j* also includes a menu of standard actions to be taken with respect to any number of selected portal windows.

The interface screen 700 of FIG. 11A is probably less prone to trader error than the interface screen 710 of FIG. 11B because a trader can still enter commands or data into the incorrect window at interface screen 710 or can experience confusion due to the multiple formats of data that are simultaneously displayed on the SuperMonitor 482.

As explained above, the system of FIG. 10B lessens some of the risks associated with prior art systems and enhances the collection of data for internal systems in clearing trades, passing the trade detail information to credit intermediaries, etc. There, however, remain issues of concern that result from a human (trader) having to interact with the system. These issues include the possibility of trader error in entering prices and accepting deals, and the possible slow response of the trader to providing and withdrawing price requests. This has been dealt with in the prior art by some price providers by replacing the trader with an automated pricing engine which generates prices that may either be published or sent to customers upon request. Some of these automated pricing engines are available for the price providers to purchase while others may be developed specifically for a particular price provider.

FIG. 12A illustrates an example of the operation of a prior art system in which an automated pricing engine 800 at the price provider generates pricing data automatically. Customer 1 submits a price request to the price provider at terminal 410 which is connected to Portal 1 415 (step 851). This request is transmitted over Portal 1 415 to an API 810 for Portal 1 which extracts the pertinent request data and forwards it to automated pricing engine 800 in the data format and protocol of automated pricing engine 800 (step 852). In response to the request, a price quote is generated by automated pricing engine 800. In generating a price, automated pricing engine 800 applies business logic 874 available to it and calculates a response based on market conditions, current trading positions 872, automated credit information 876 for the customer requesting the price quote, and possibly other factors. A trader 877 may intervene in the automated pricing process for whatever reason. The generated price quote is sent to API (step 853), where the price quote is translated to the format and protocol of Portal 1 415, and forwarded to Customer 1 (step 854).

Customer 4 requests a price quote for a similar product at terminal 440 which is connected to Portal 4 445. This price request must similarly be translated at another API 840 at Portal 4 from the data format and protocol of Portal 4 to the format and protocol of automated pricing engine 800 (step 855) before it is transmitted to automated pricing engine 800 (step 856). After a price is generated by automated pricing engine 800, the price data is transmitted to Customer 4 (step 857), but must first be translated at API 840 to the format and protocol of Portal 4 (step 858). If Customer 1 then decides to deal at the quoted price (step 859), the automated pricing engine 800 is alerted to the acceptance of the deal (step 860), but again the data must be translated at API 810 before it is forwarded to the price provider.

The translation of data at API's 810, 820, 830, 840 not only enables the automated pricing but also enables deal details (including the deal with Customer 1) to be captured automatically at 870 (step 860A), and to incorporated automatically into the price provider's database 872 that tracks its position record in a particular product (step 860B). Automated pricing engine 800 is sent or retrieves the position details (step 860C), which in then uses in determining further price provider decisions, such as whether to withdraw existing quotes, make new ones, and future price to be quoted (step 860C). If it is determined that the previously quoted price to Customer 4 should be withdrawn and replaced with a new price, this can be quickly communicated to Customer 4 (steps 861, 862), usually more quickly than a trader could react. This prior art embodiment is not especially cost-effective or efficient because an API will be made available by each portal and the price provider must interface to each of these different APIs as necessary for internal use.

These costs and necessary efforts are substantially reduced with the present invention, an example of which is illustrated in FIG. 12B. Using the present invention, data exchanged with customers is normalized at a Central Router 480 that routes data between the customers and the price provider. This eliminates the need for each price provider to provide separate API's for each portal. Moreover, as explained above, a third party other than the customer and price provider may operate the Central Router so that the price providers are relieved of technical complications and can focus on the business of trading.

In this example, when Customer 1 sends a price request via Portal 1, the price request is forwarded through a gateway at Portal 1 419 (step 881), where the format and protocol of the price request is normalized, to the Central Router 480 (step 882). The price request is then transmitted to the price provider's API 481 and into automated pricing engine 800. A price is generated by automated pricing engine 800 and is returned to Customer 1 through API 481, Central Router 480, and gateway 419, where the format and protocol of the price data is translated into the format and protocol of Portal 1 (step 883), before the price is sent to Customer 1 (step 884). As in the prior art embodiment of FIG. 12A, a trader at 877 may intervene in the automated pricing process for whatever reason.

Similarly, Customer 4 sends a price request through Portal 4 for the same product for which Customer 1 was provided with a price (step 885). The request is transmitted to Central Router 480 via gateway 449, where the request is normalized, and is then transmitted via API 481 to the price provider (step 886). The automated pricing engine 800 generates a second price quote which it transmits in the reverse direction to Customer 4 through API 481, Central Router 480 and gateway 449 (steps 887, 888). If Customer 1 now agrees to deal and accepts the price (steps 889, 890), the automated pricing engine 800 can quickly and automatically withdraw the previous price quote to Customer 4, if it determines that to be appropriate based on its revised position 872, and can provide a new price (steps 891, 892). The automated pricing engine does not form a part of the present invention.

In addition to the already emphasized advantages of the embodiments of FIGS. 10B and 12B, the normalization of data into a standardized format simplifies the clearance of the trades. Trade details can be captured automatically after execution of the trade and can be passed on to the price provider's internal systems for recordation. These internal systems may be designed to use the standardized data format and protocol or may be again translated at the price provider into a different format and protocol of the internal systems (which may occur, for example, where the internal systems at the price provider are legacy systems that the price provider does not wish to replace). The trade details can also be sent to the customer who engaged in the trade.

The system and data flow illustrated in FIG. 12C is analogous to the system and data flow of FIG. 12B, except that in FIG. 12C a Credit Intermediary 1 900 has extended credit to at least one of the customers and is required for making a trade with that customer. In this event, Credit Intermediary 1 900 may also connect via its own API 910 to Central Router 480. This enables a price provider to contact a credit intermediary and check on whether to proceed in trading with a particular customer who has obtained credit from this credit intermediary. Alternatively, or in addition, the credit intermediary can monitor the exchange of trade information or control whether the customer can trade with the credit intermediary. Moreover, it enables the credit intermediary to be almost immediately apprised of a trade (step 893) for which it is responsible so that it can record the trade and make any necessary adjustments to the credit line of its customer quickly before the customer engages in further trades. The trade details of the trade between Price Provider 1 and Customer 1 may be automatically reported to Credit Intermediary 1 900 by Price Provider or may be left to Portal 1 415 to report to Credit Intermediary 900.

As shown in FIG. 5, credit Intermediary 1 900 may use the standardized data format and protocol for its systems as well so that no data format and protocol translation is necessary at Central Router 480 or any necessary translation may be performed at Central Router 480.

While the role of credit intermediary 900 and the credit intermediary in general in any of the above described embodiments, including those shown in FIGS. 4-8, 10B and 12B can include receiving details of trades, the connectivity of the credit intermediary to the overall system enables a closer participation of the credit intermediary in the trading process. For example, the credit intermediary can arrange that all price requests from customers to whom it has extended credit be routed to it first before being routed to a price provider. In this way, the credit intermediary can check whether the customer is trying to use the credit line in accordance with any credit intermediary limitations, such as to the type of products that can be traded with the credit line, and the credit line itself. If the price request is acceptable, the credit intermediary can then forward the price requests to a price provider itself or enable the customer to submit the price request to be submitted to a price provider. The credit intermediary can also monitor the prices quoted, and ongoing trade-related communications between its customers and the price provider(s). Alternatively, the credit intermediary need not receive the price requests and can simply monitor the trade-related communications. The price provider may also first contact the credit intermediary to obtain authorization for a trade. Thus, using the present invention, the credit intermediary is able substantially in real time to closely monitor and/or control its credit risk.

The invention also enables a customer to request a price from a price provider through any portal where the price provider is not actually able to provide its own price quotes for the type of product for which a price is requested. The price provider can forward the request automatically to a third party who does provide prices for this type of product, and can receive from the third party a price which it can then forward to the customer within a short time, with or without a mark-up added by the price provider. This enables the price provider to offer a customer a wide range of products without the customer being aware that the price provider does not itself directly trade in all of the products offered.

It should be understood that the foregoing embodiments are merely exemplary of the present invention and that alternative embodiments are within the scope of the present invention. For example, any number and type of portals and portals may be used, any type of hardware and software may be used, to provide the functionality described herein, and any type of communication links and protocols may be used. Moreover, various aspects of each embodiment may be combined. It should also be understood that a SuperMonitor can be used by both a price provider to provide a price and by a customer to request a price, which permits a customer to have only a single monitor (or only a small number of monitors if one is not sufficient to show all portal information), to place trades. This is particularly useful as an entity may be a price provider for one trade and a customer in a different trade.

While there have been shown and described and pointed out fundamental novel features of the invention as applied to preferred embodiments thereof, it will be understood that various omissions and substitutions and changes in the form and details of the devices illustrated, and in their operation, may be made by those skilled in the art without departing from the spirit of the invention. For example, it is expressly intended that all combinations of those elements which perform substantially the same function in substantially the same way to achieve the same results are within the scope of the invention. It is the intention, therefore, to be limited only as indicated by the scope of the claims appended hereto.

The invention claimed is:

1. A system for electronically exchanging data related to financial transactions between a plurality of price providers which provides price quotes for trading financial instruments and executes trades and a plurality of customers of the price providers through a plurality of electronic portals, wherein each of the plurality of electronic portals is configured to use one of multiple different portal-specific data formats, the system comprising:
   a plurality of gateways, each gateway being linked to a different one of the plurality of electronic portals, wherein the gateways are each configured to normalize a data stream received from any of the plurality of electronic portals from a respective portal-specific format to a single standardized format,
   a central transit router that links the gateways to the price providers, the central transit router configured to aggregate multiple normalized data streams from the gateways into a single combined normalized data stream transmitted to the respective price provider,
   wherein each gateway is configured to translate price provider data received in the single standardized format from the price provider via the central transit router to the respective portal-specific format of the particular portal of the plurality of electronic portals to which the data is routed, and
   a price provider graphical user interface for display to at least one of the price providers, the price provider graphical user interface configured to substantially simultaneously display price quotation data exchanged by said at least one of the price providers with at least two of the electronic portals concerning the same financial product.

2. The system of claim 1, wherein the data that is exchanged between the price providers and the customers comprises at least one of a customer request for a price quote for a trade, a price quote provided by at least one of the price providers, a message relating to negotiation of a price for a trade between the customer and at least one of the price providers, an instruction to complete the trade, a trade detail data, and free-format text based conversation.

3. The system of claim 1, further comprising a display located at each of said at least one of the price providers for displaying the price provider graphical user interface.

4. The system of claim 3, wherein the price provider graphical user interface is configured to display data from the at least two electronic portals substantially simultaneously in separate windows on the display, at least two of the windows having a substantially identical user interface.

5. The system of claim 3, wherein each of the plurality of electronic portals utilizes a respective portal-specific graphical user interface, wherein the price provider graphical user interface comprises the portal-specific graphical user interfaces, wherein the price provider graphical user interface is configured to display the data from the at least two electronic portals substantially simultaneously in separate windows on the display using the respective portal-specific graphical user interfaces, and wherein the price provider graphical user interface includes a set of uniform commands for interacting with the at least two electronic portals.

6. The system of claim 1, further comprising:

for each price provider, a price provider computer system arranged with an application program interface configured to present the normalized data in the standardized format to the price provider computer system so that the normalized data is readable by the price provider computer system, each respective application program interface of the price provider computer systems being connected to the central transit router.

7. The system of claim 6, wherein at least one of the price provider computer systems comprises an automated pricing engine that automatically generates a price quote in response to a request.

8. The system of claim 1, further comprising an application program interface for presenting data in a normalized format to an internal computer system of a credit intermediary that extends credit to a customer.

* * * * *